(12) United States Patent
Furtaw et al.

(10) Patent No.: US 11,154,862 B2
(45) Date of Patent: *Oct. 26, 2021

(54) METHODS FOR USING MULTI-SHEATH FLOW AND ON-CHIP TERMINATING ELECTRODE FOR MICROFLUIDIC DIRECT-BLOTTING

(71) Applicant: LI-COR, Inc., Lincoln, NE (US)

(72) Inventors: Michael D. Furtaw, Lincoln, NE (US); Donald T. Lamb, Lincoln, NE (US); Lyle R. Middendorf, Lincoln, NE (US)

(73) Assignee: LiCor, Inc., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,895

(22) Filed: May 18, 2020

(65) Prior Publication Data

US 2020/0276583 A1 Sep. 3, 2020

Related U.S. Application Data

(62) Division of application No. 15/670,939, filed on Aug. 7, 2017, now Pat. No. 10,737,268.

(Continued)

(51) Int. Cl.
*G01N 27/447* (2006.01)
*B01L 3/00* (2006.01)
(Continued)

(52) U.S. Cl.
CPC ....... *B01L 3/502753* (2013.01); *B01L 3/0268* (2013.01); *B01L 3/50273* (2013.01);
(Continued)

(58) Field of Classification Search
CPC .......... G01N 27/447–44795; B01D 57/00–52; C02F 1/4696; B81B 1/00–008
(Continued)

(56) References Cited

U.S. PATENT DOCUMENTS 4,631,120 A 12/1986 Pohl
4,885,076 A 12/1989 Smith et al.
(Continued)

FOREIGN PATENT DOCUMENTS

CN 101581728 A 11/2009
CN 101609088 A 12/2009
(Continued)

OTHER PUBLICATIONS

Application No. PCT/US2015/039121, International Preliminary Report on Patentability, dated Jan. 26, 2017, 7 pages.
(Continued)

*Primary Examiner* — Bach T Dinh
(74) *Attorney, Agent, or Firm* — Kilpatrick Townsend & Stockton LLP

(57) ABSTRACT

Devices and methods are provided for the separation and dispensing of material using a microfluidic separation column connected via an exit channel to one or more sheath flow channels. The flow of separated material through the separation column is at least partially driven by a voltage potential between a first electrode within the separation column and a terminating electrode within at least one of the sheath flow channels. The separation column, exit channel, sheath flow channels, and electrodes are all within a single monolithic chip. The presence of an on-chip terminating electrode allows for separated material to be entrained in the sheath fluids and ejected onto a surface that can be non-conductive. The presence of multiple sheath flows allows for sheath flow fluids to have different compositions from one another, while reducing the occurrence of sheath flow fluids entering the separation column.

14 Claims, 7 Drawing Sheets

Related U.S. Application Data

(60) Provisional application No. 62/372,229, filed on Aug. 8, 2016.

(51) Int. Cl.
*B01L 3/02* (2006.01)
*G01N 1/40* (2006.01)

(52) U.S. Cl.
CPC ....... *G01N 1/405* (2013.01); *G01N 27/44739* (2013.01); *G01N 27/44756* (2013.01); *G01N 27/44791* (2013.01); *B01L 3/5027* (2013.01); *B01L 3/502776* (2013.01); *B01L 2200/0631* (2013.01); *B01L 2200/0636* (2013.01); *B01L 2300/06* (2013.01); *B01L 2300/069* (2013.01); *B01L 2300/0681* (2013.01); *B01L 2300/0867* (2013.01); *B01L 2400/0415* (2013.01); *B01L 2400/0421* (2013.01); *B01L 2400/0487* (2013.01)

(58) Field of Classification Search
USPC ............... 204/450–470, 546–550, 600–621, 204/643–645
See application file for complete search history.

(56) References Cited

U.S. PATENT DOCUMENTS

| | | | |
|---|---|---|---|
| 5,094,594 A | 3/1992 | Brennan | |
| 5,234,559 A | 8/1993 | Collier et al. | |
| 5,275,710 A | 1/1994 | Gombocz et al. | |
| 5,393,975 A | 2/1995 | Hail et al. | |
| 5,423,964 A | 6/1995 | Smith et al. | |
| 5,474,663 A | 12/1995 | Brunk et al. | |
| 5,868,322 A | 2/1999 | Loucks, Jr. et al. | |
| 5,916,429 A | 6/1999 | Brunk | |
| 5,917,184 A | 6/1999 | Carson et al. | |
| 6,179,584 B1 | 1/2001 | Howitz et al. | |
| 6,602,391 B2 | 8/2003 | Serikov | |
| 6,633,031 B1 | 10/2003 | Schultz et al. | |
| 6,787,313 B2 | 9/2004 | Morozov et al. | |
| 6,830,934 B1 | 12/2004 | Harding et al. | |
| 7,759,639 B2 | 7/2010 | Schlaf et al. | |
| 7,784,911 B2 | 8/2010 | Kim et al. | |
| 8,293,337 B2 | 10/2012 | Bhatnagar et al. | |
| 8,294,119 B2 | 10/2012 | Arscott et al. | |
| 8,470,570 B2 | 6/2013 | Kim et al. | |
| 8,613,845 B2 | 12/2013 | Maxwell et al. | |
| 9,182,371 B2 | 11/2015 | Kennedy et al. | |
| 9,465,014 B2 | 10/2016 | Dovichi et al. | |
| 10,126,264 B2 | 11/2018 | Furtaw | |
| 10,670,560 B2 | 6/2020 | Furtaw et al. | |
| 10,737,268 B2 * | 8/2020 | Furtaw ............. G01N 27/44739 | |
| 2001/0055529 A1 | 12/2001 | Wixforth | |
| 2002/0197622 A1 | 12/2002 | McDevitt et al. | |
| 2003/0178563 A1 | 9/2003 | Makarov et al. | |
| 2003/0215855 A1 | 11/2003 | Dubrow et al. | |
| 2004/0058423 A1 | 3/2004 | Albritton et al. | |
| 2004/0113068 A1 | 6/2004 | Bousse et al. | |
| 2004/0247450 A1 | 12/2004 | Kutchinsky et al. | |
| 2004/0265182 A1 | 12/2004 | Chen et al. | |
| 2005/0023141 A1 | 2/2005 | Amshey et al. | |
| 2005/0040328 A1 | 2/2005 | Donegan et al. | |
| 2006/0192107 A1 | 8/2006 | DeVoe et al. | |
| 2007/0035587 A1 | 2/2007 | Lee et al. | |
| 2007/0039866 A1 | 2/2007 | Schroeder et al. | |
| 2009/0035770 A1 | 2/2009 | Mathies et al. | |
| 2009/0060797 A1 | 3/2009 | Mathies et al. | |
| 2011/0005932 A1 | 1/2011 | Jovanovich et al. | |
| 2011/0042216 A1 | 2/2011 | Maxwell et al. | |
| 2012/0043208 A1 | 2/2012 | Jin et al. | |
| 2013/0032031 A1 | 2/2013 | Bartko et al. | |
| 2013/0140180 A1 | 6/2013 | Dovichi et al. | |
| 2013/0213811 A1 | 8/2013 | Kennedy et al. | |
| 2013/0327936 A1 | 12/2013 | Ramsey et al. | |
| 2013/0337502 A1 | 12/2013 | Bosmeyer et al. | |
| 2014/0014747 A1 | 1/2014 | Moeller et al. | |
| 2014/0319335 A1 | 10/2014 | Morris et al. | |
| 2015/0233877 A1 | 8/2015 | Dovichi et al. | |
| 2015/0247187 A1 | 9/2015 | Bermpohl | |
| 2015/0279648 A1 | 10/2015 | Furtaw et al. | |
| 2016/0011149 A1 | 1/2016 | Furtaw | |
| 2016/0153944 A1 | 6/2016 | Douce et al. | |
| 2016/0181078 A1 | 6/2016 | Kovarik | |
| 2017/0176386 A1 * | 6/2017 | Gentalen ........... B01L 3/502715 |
| 2017/0219522 A1 | 8/2017 | Furtaw et al. | |
| 2018/0036729 A1 | 2/2018 | Furtaw et al. | |
| 2018/0036730 A1 | 2/2018 | Furtaw et al. | |

FOREIGN PATENT DOCUMENTS

| | | |
|---|---|---|
| CN | 101613660 A | 12/2009 |
| JP | 3775305 | 5/2006 |
| WO | 2015019159 A1 | 2/2015 |
| WO | 2015031820 A1 | 3/2015 |
| WO | 2016010748 | 1/2016 |
| WO | 2017136284 | 8/2017 |
| WO | 2018031479 | 2/2018 |
| WO | 2018031483 | 2/2018 |

OTHER PUBLICATIONS

Amantonico et al., "Facile Analysis of Metabolites by Capillary Electrophoresis Coupled to Matrix-assisted Laser Desorption/ionization Mass Spectrometry Using Target Plates with Polysilazane Nanocoating and Grooves," Analyst, vol. 134, May 27, 2009, pp. 1536-1540.

Anderson et al., "Western Blotting Using Capillary Electrophoresis," Analytical Chemistry, vol. 83, No. 4, Jan. 25, 2011, pp. 1350-1355.

Avseenko et al., "Immobilization of Proteins in Immunochemical Microarrays Fabricated by Electrospray Deposition," Analytical Chemistry, vol. 73, No. 24, Dec. 15, 2001, pp. 6047-6052.

Avseenko et al., "Immunoassay with Multicomponent Protein Microarrays Fabricated by Electrospray Deposition," Analytical Chemistry, vol. 74, No. 5, Mar. 1, 2002, pp. 927-933.

Back et al., "Capillary Electrophoresis with Nanoparticle Matrix for DNA Analysis," Bulletin of the Korean Chemical Society, vol. 27, No. 1, 2006, pp. 133-136.

Delaney Jr. et al., "Inkjet Printing of Proteins," Soft Matter, vol. 5, Sep. 22, 2009, pp. 4866-4877.

Derby, "Inkjet Printing of Functional and Structural Materials: Fluid Property Requirements, Feature Stability, and Resolution," Annual Review of Materials Research, vol. 40, Mar. 9, 2010, pp. 395-414.

EP17747982.1, "Extended European Search Report," dated Aug. 7, 2019, 10 pages.

Ertl et al., "Capillary Electrophoresis Chips with a Sheath-Flow Supported Electrochemical Detection System," Analytical Chemistry, vol. 76, No. 13, XP-001209796, Jul. 1, 2004, pp. 3749-3755.

Gast et al., "The Development of Integrated Microfluidic Systems at GeSiM," Lab on a Chip, vol. 3, No. 1, 2003, pp. 6N-10N.

Han et al., "BioPen: Direct Writing of Functional Material at the Point of Care," Scientific Reports, vol. 4, No. 4872, May 6, 2014, pp. 1-5.

Helmja et al., "Fraction Collection in Capillary Electrophoresis for Various Stand-alone Mass Spectrometers," Journal of Chromatography A, vol. 1216, No. 17, Apr. 24, 2009, pp. 3666-3673.

Hou et al., "Direct Detection and Drug-Resistance Profiling of Bacteremias using Inertial Microfluidics," Lab on a Chip, vol. 15, No. 10, May 21, 2015, pp. 2297-2307.

Jaworek et al., "Electrospraying Route to Nanotechnology: An Overview," Journal of Electrostatics, vol. 66, 2008, pp. 197-219.

Jin et al., "Multiplexed Western Blotting Using Microchip Electrophoresis," Analytical Chemistry, vol. 88, No. 13, Jul. 5, 2016, pp. 6703-6710.

Jin et al., "Western Blotting Using Microchip Electrophoresis Interfaced to a Protein Capture Membrane," Analytical Chemistry, vol. 85, No. 12, Jun. 18, 2013, pp. 6073-6079.

(56) References Cited

OTHER PUBLICATIONS

Johnson et al., "A CE-MALDI Interface Based on the Use of Prestructured Sample Supports," Analytical Chemistry, vol. 73, No. 8, Apr. 15, 2001, pp. 1670-1675.
Kim et al., "Design and Evaluation of Single Nozzle with a Non-conductive Tip for Reducing Applied Voltage and Pattern Width in Electrohydrodynamic Jet Printing (EHDP)," Journal of Micromechanics and Microengineering, vol. 20, 2010, pp. 1-7.
Korkut et al., "Enhanced Stability of Electrohydrodynamic Jets through Gas Ionization," Physical Review Letters, vol. 100, No. 3, Jan. 25, 2008, pp. 034503-1-034503-4.
Lu et al., "Coupling Sodium Dodecyl Sulfate-Capillary Polyacrylamide Gel Eletrophoresis with Matrix-Assisted Laser Desorption Ionization Time-of-Flight Mass Spectrometry via a Poly(tetrafluoroethylene) Membrane," Analytical Chemistry, vol. 83, No. 5, Mar. 1, 2011, pp. 1784-1790.
Magnusdottir et al., "Micropreparative Capillary Electrophoresis of DNA by Direct Transfer onto a Membrane," Electrophoresis, vol. 18, No. 11, Oct. 1997, pp. 1990-1993.
Martin et al., "Inkjet Printing—The Physics of Manipulating Liquid Jets and Drops," Engineering and Physics-Synergy for Success, Journal of Physics: Conference Series, vol. 105, 2008, pp. 1-14.
Morozov et al., "Electrospray Deposition as a Method for Mass Fabrication of Mono-and Multicomponent Microarrays of Biological and Biologically Active Substances," Analytical Chemistry, vol. 71, No. 15, Aug. 1, 1999, pp. 3110-3117.
Morozov et al., "Electrospray Deposition as a Method to Fabricate Functionally Active Protein Films," Analytical Chemistry, vol. 71, No. 7, Apr. 1, 1999, pp. 1415-1420.
PCT/US2015/039121, "International Search Report and Written Opinion," dated Sep. 30, 2015, 9 pages.
PCT/US2017/015657, "International Preliminary Report on Patentability," dated Feb. 3, 2018, 13 pages.
PCT/US2017/015657, "International Search Report and Written Opinion," dated Apr. 4, 2017, 18 pages.
PCT/US2017/015657, "Written Opinion," dated Aug. 31, 2017, 14 pages.
PCT/US2017/045774, "International Preliminary Report on Patentability," dated Feb. 21, 2019, 9 pages.
PCT/US2017/045774, "International Search Report and Written Opinion," dated Dec. 1, 2017, 16 pages.
PCT/US2017/045778, "International Preliminary Report on Patentability," dated Feb. 21, 2019, 9 pages.
Rejtar et al., "Off-Line Coupling of High-Resolution Capillary Electrophoresis to MALDI-TOF and TOF/TOF MS," Journal of Proteome Research, vol. 1, No. 2, Mar.-Apr. 2002, pp. 171-179.
Smith et al., "Sample Introduction and Separation in Capillary Electrophoresis, and Combination with Mass Spectrometric Detection," Talanta, vol. 36, Nos. 1-2, Jan.-Feb. 1989, pp. 161-169.
Tracht et al., "Postcolumn Radionuclide Detection of Low-Energy $\beta$ Emitters in Capillary Electrophoresis," Analytical Chemistry, vol. 66, No. 14, Jul. 15, 1994, pp. 2382-2389.
Uematsu et al., "Surface Morphology and Biological Activity of Protein Thin Films Produced by Electrospray Deposition," Journal of Colloid and Interface Science, vol. 269, No. 2, Jan. 15, 2004, pp. 336-340.
Wei et al., "Electrospray Sample Deposition for Matrix-Assisted Laser Desorption/Ionization (MALDI) and Atmospheric Pressure MALDI Mass Spectrometry With Attomole Detection Limits," Rapid Communications in Mass Spectrometry, vol. 18, No. 11, 2004, pp. 1193-1200.
Zhang et al., "Capillary Electrophoresis Combined with Matrix-Assisted Laser Desorption/Ionization Mass Spectrometry; Continuous Sample Deposition on a Matrix-precoated Membrane Target," Journal of Mass Spectrometry, vol. 31, No. 9, Sep. 1996, pp. 1039-1046.
Zhong et al., "Recent Advances in Coupling Capillary Electrophoresis-Based Separation Techniques to ESI and MALDI-MS," Electrophoresis, vol. 35, No. 9, May 2014, pp. 1214-1225.
CN201780008450.7, "Office Action," dated Dec. 17, 2019, 8 pages.
PCT/US2015/039121, "International Preliminary Report on Patentability," dated Jan. 26, 2017, 7 pages.
PCT/US2017/045778, "International Search Report and Written Opinion," dated Dec. 22, 2017, 13 pages.
Application No. CN201780047883.3, Office Action, dated Jan. 6, 2021, 12 pages.
Application No. CN201780047902.2, Office Action, dated Jan. 6, 2021, 9 pages.
U.S. Appl. No. 15/670,896, Non-Final Office Action, dated Feb. 23, 2021, 16 pages.
Application No. CN201780047883.3, Office Action, dated Jan. 6, 2021, 22 pages (with translation).
U.S. Appl. No. 15/670,896, Final Office Action, dated Apr. 30, 2021, 17 pages.
Application No. CN201780008450.7, Office Action, dated Jul. 14, 2020, 6 pages.
Application No. CN201780047902.2, Office Action, dated Jan. 6, 2021, 14 pages.
Application No. PCT/US2015/039121, International Preliminary Report on Paientability, dated Jan. 26, 2017, 7 pages.
Application No. PCT/US2017/045778, International Search Report and Written Opinion, dated Dec. 22, 2017, 13 pages.

* cited by examiner

METHODS FOR USING MULTI-SHEATH FLOW AND ON-CHIP TERMINATING ELECTRODE FOR MICROFLUIDIC DIRECT-BLOTTING

CROSS-REFERENCES TO RELATED APPLICATIONS

The present application is a divisional of U.S. patent application Ser. No. 15/670,939, filed Aug. 7, 2017, which claims the benefit of U.S. Provisional Patent Application No. 62/372,229 filed Aug. 8, 2016, the full disclosures of which are incorporated herein by reference in their entireties for all purposes.

STATEMENT AS TO RIGHTS TO INVENTIONS MADE UNDER FEDERALLY SPONSORED RESEARCH AND DEVELOPMENT

This invention was made with government support under Grant No. 1R43GM112289-01 awarded by the National Institutes of Health. The government has certain rights in the invention.

BACKGROUND

Western blotting is a ubiquitous analytical technique for identifying and quantifying specific proteins in a complex mixture. In the technique, gel electrophoresis is used to separate proteins in a gel based on properties such as tertiary structure, molecular weight, isoelectric point, polypeptide length, or electrical charge. Once separated, the proteins are then transferred from the gel to a membrane—typically made of nitrocellulose, nylon, or polyvinylidene fluoride (PVDF)—that binds proteins non-specifically. A commonly used method for carrying out this transfer is electroblotting, in which an electrical current is used to pull proteins from the gel into the membrane. The membrane is then stained with probes specific for the proteins being targeted, allowing the location and amounts of these proteins to be detected.

Capillary electrophoresis provides an alternative to the gel electrophoresis separation associated with western blotting and other biotechnology procedures. In capillary electrophoresis, materials such as proteins are separated electrokinetically, as in gel electrophoresis, but with much smaller required volumes. The capillaries used in this technique are typified by diameters smaller than one millimeter and are in some instances incorporated into microfluidic or nanofluidic devices.

Previous work has demonstrated the benefits of applying microfluidic devices to Western blotting of proteins (Jin et al. 2013 *Anal. Chem.* 85:6073). These devices electrically transfer separated proteins to a blotting surface that is itself the terminating electrode. (See, e.g., U.S. Pat. No. 9,182, 371). This electrical field blotting approach requires continuous electrical contact from a separation device to the surface. As a result, the surface must be electrically conductive (e.g., a wet membrane on metal platen).

In electric field blotting, proteins migrate toward the surface via electrophoresis. Since the cross-sectional area of the current flow abruptly increases upon exiting the separation device, the electric field abruptly diminishes. Also, since the surface is typically wet, a large meniscus tends to form around the point of contact between the separation device and the surface. This large meniscus can comprise recirculation zones in which analytes such as proteins can be trapped and mixed, reducing the resolution of separation. Furthermore, the electrical field blotting force is only applied while the separation device is above the analyte. If a surface and separation device move to a different position relative to one another, the electrical force is removed and only diffusion forces cause the analyte to become immobilized in the surface membrane.

BRIEF SUMMARY

In general, provided herein are devices and methods for the dispensing of small, controllable amounts of material that have been separated by microfluidic electrophoresis. The separation of material occurs within a microfluidic separation column that is connected to an exit channel. The separation column and the exit channel are both elements of a single monolithic chip. One or more sheath flow channels are also present on the chip and connected to the exit channel such that sieving gel, organic solvent, or other fluid can be passed or pumped through the sheath flow channels and into the exit channel. A voltage can be applied between a first electrode within the separation column and a terminating electrode within one of the sheath flow channels, such that one or more analytes electrophorese through the separation column and into the exit channel. Within the exit channel, the separated analytes are entrained in the sheath flows to form an effluent. The effluent is then ejected out of a discharge outlet of the exit channel and onto a receiving surface. In this configuration, because the terminating electrode is within the chip and not the receiving surface, there is no electrical requirement for the receiving surface.

The use of more than one sheath flow channels and fluids allows a primary sheath flow to counteract potential backflow of other sheath flows into the separation column. For example, in the case of a primary and secondary sheath flow, at most a very small percentage of the secondary sheath flow will penetrate the primary sheath flow to enter the separation column. This allows the composition of the secondary sheath flow liquid to substantially differ from that of the separation column liquid, without changing the conditions within the separation column over time. As another example, a tertiary sheath flow can be used to contribute an organic solvent to the effluent, enabling dispensing of the effluent by electrospray. In this configuration, the secondary sheath flow acts as a barrier between the tertiary and primary sheath flows. This can be important when, for example, contacting the organic solvent of the tertiary sheath flow with a sieving gel of the primary sheath flow and the separation column can cause undesired precipitation of solids to occur within the sieving gel.

One provided apparatus comprises a separation column having an input end and an output end. The input end has an opening configured to accept a fluid sample. A first electrode is within the separation column and proximate to the input end of the separation column. The apparatus further comprises an exit channel having an upstream end and a downstream end. The upstream end of the exit channel is connected to the output end of the separation column. The downstream end of the exit channel has a discharge outlet. The apparatus further comprises a primary sheath fluid reservoir and a pressure source connected to the primary sheath fluid reservoir. The apparatus further comprises one or more flow channels. Each of the one or more flow channels has an entrance end and an intersecting end. One of the one or more flow channels is a primary sheath flow channel. The intersecting end of the primary sheath flow channel intersects the exit channel. The primary sheath flow channel connects the primary sheath fluid reservoir with the exit channel. A second electrode is within one of the one or more flow channels.

In some embodiments, the second electrode is within the primary sheath flow channel. In some embodiments, one of the one or more flow channels is a secondary sheath flow channel, wherein the intersecting end of the secondary sheath flow channel intersects the exit channel at a location between the exit channel discharge outlet and the intersection of the primary sheath flow channel and the exit channel. In some embodiments, one of the one or more flow channels is a secondary sheath flow channel, wherein the intersecting end of the secondary sheath flow channel intersects the primary sheath flow channel. In some embodiments, the second electrode is within the secondary sheath flow channel.

In some embodiments, the apparatus further comprises a surface positioned across a gap from the discharge outlet, and a motor configured to move the surface laterally with respect to the discharge outlet. In some embodiments, the apparatus further comprises a surface positioned across a gap from the discharge outlet, and a motor configured to move the discharge outlet laterally with respect to the surface. In some embodiments, the apparatus further comprises a membrane affixed to the surface. A region of the membrane immediately across from the discharge outlet can be dry until wetted by an effluent exiting from the discharge outlet. The effluent can comprise an analyte. The effluent can wick into the membrane to immobilize the analyte in the membrane. In some embodiments, the apparatus further comprises a vacuum manifold connected to the surface, wherein the vacuum manifold is configured to affix the membrane to the surface and to immobilize the analyte in the membrane.

In some embodiments, the pressure source connected to the primary sheath fluid reservoir is a first pressure source, and the apparatus further comprises an organic solvent reservoir. The apparatus can further comprise a second pressure source connected to the organic solvent reservoir. One of the one or more flow channels can be a tertiary sheath flow channel connecting the organic solvent reservoir with the exit channel. The intersecting end of the tertiary sheath flow channel can intersect the exit channel at a location between the exit channel discharge outlet and the intersection of the secondary sheath flow channel and the exit channel. The intersecting end of the tertiary sheath flow channel can intersect the exit channel at a location between the exit channel discharge outlet and the intersection of the primary sheath flow channel and the exit channel.

In some embodiments, the apparatus further comprises a surface positioned across a gap from the discharge outlet. The apparatus can further comprise a motor configured to move the surface laterally with respect to the discharge outlet. The apparatus can further comprise a motor configured to move the discharge outlet laterally with respect to the surface. The apparatus can further comprise a third electrode connected to the surface. The third electrode can be configured to electrospray an effluent from the discharge outlet to the surface.

In some embodiments, the apparatus further comprises a sieving gel inside the separation column, the primary sheath fluid reservoir, and the primary sheath flow channel. In some embodiments, the apparatus further comprises a sieving gel inside the separation column, the primary sheath fluid reservoir, and the primary sheath flow channel; and a fluid inside the secondary sheath flow channel. In some embodiments, the apparatus further comprises a sieving gel inside the separation column, and a fluid inside the primary sheath fluid reservoir, the primary sheath flow channel, and the secondary sheath flow channel. In some embodiments, the fluid is the sieving gel. In some embodiments, the fluid is less viscous than the sieving gel. In some embodiments, the fluid comprises an analyte modifier. In some embodiments, the analyte modifier is a protein stain.

In some embodiments, the separation column and the one or more flow channels are integrated on a single monolithic chip. In some embodiments, the apparatus further comprises a chip-mounted seal at an entrance end of at least one of the one or more flow channels. In some embodiments, the pressure source connected to the primary sheath fluid reservoir is a first pressure source, and the apparatus further comprises a second pressure source connected to the secondary sheath flow channel. In some embodiments, the pressure source is an inkjet impulsive pump.

Also provided is a method of separating and dispensing an analyte. The method comprises providing a separation column, a primary sheath flow channel, a secondary sheath flow channel, and an exit channel. The separation column has an input end and an output end. The output end of the separation column is connected to the exit channel. The primary sheath flow channel intersects the exit channel. The secondary sheath flow channel intersects the primary sheath flow channel. The method further comprises pumping a primary sheath fluid through the primary sheath flow channel. The method further comprises passing a secondary sheath fluid through the secondary sheath flow channel. The method further comprises applying a voltage between the input end of the separation column and the secondary sheath flow channel. The voltage is sufficient to electrophorese an analyte through the separation column and into the exit channel. The method further comprises entraining the analyte in the pumped primary sheath fluid to form an effluent. The method further comprises ejecting the effluent onto a surface.

Also provided is a method of separating and dispensing an analyte. The method comprises providing a separation column, a primary sheath flow channel, a secondary sheath flow channel, and an exit channel. The separation column has an input end and an output end. The exit channel has an upstream end and a downstream end. The output end of the separation column is connected to the upstream end of the exit channel. The primary sheath flow channel intersects the exit channel. The secondary sheath flow channel intersects the exit channel at a location between the downstream end of the exit channel and the intersection of the primary sheath flow channel and the exit channel. The method further comprises pumping a primary sheath fluid through the primary sheath flow channel. The method further comprises passing a secondary sheath fluid through the secondary sheath flow channel. The method further comprises applying a voltage between the input end of the separation column and the secondary sheath flow channel. The voltage is sufficient to electrophorese an analyte through the separation column and into the exit channel. The method further comprises entraining the analyte in the pumped primary sheath fluid. The method further comprises thinning, within the passed fluid, the analyte in the pumped primary sheath fluid to form an effluent. The method further comprises ejecting the effluent onto a surface.

In some embodiments, the method further comprises wicking the effluent into a membrane affixed to the surface to immobilize the analyte in the membrane. In some embodiments, the method further comprises affixing the membrane to the surface and immobilizing the analyte in the membrane using a vacuum manifold connected to the surface.

In some embodiments, the secondary sheath fluid is the primary sheath fluid. In some embodiments, the secondary sheath fluid is less viscous than the primary sheath fluid. In some embodiments, the secondary sheath fluid has a higher flow rate than that of the primary sheath fluid.

In some embodiments, the method further comprises providing a tertiary sheath flow channel, wherein the tertiary sheath flow channel intersects the exit channel at a location between the downstream end of the exit column and the intersection of the primary sheath flow channel and the exit channel. In some embodiments, the method further comprises providing a tertiary sheath flow channel, wherein the tertiary sheath flow channel intersects the exit channel at a location between the downstream end of the exit column and the intersection of the secondary sheath flow channel and the exit channel. The method can further comprise flowing an organic solvent through the tertiary sheath flow channel. The method can further comprise mixing the flowed organic solvent with the effluent. In some embodiments, the mixing forms a spray mixture. In some embodiments, the method further comprises imparting a voltage between the organic solvent and the surface. In some embodiments, the ejecting includes electrospraying of the spray mixture.

In some embodiments, the method further comprises independently adjusting the flow rates of primary sheath fluid, secondary sheath fluid, and organic solvent so as to minimize confluence of the primary sheath fluid and the organic solvent. In some embodiments, the method further comprises independently adjusting the flow rates of the primary sheath fluid, secondary sheath fluid, and organic solvent so as to control the concentrations of the primary sheath fluid, the secondary sheath fluid, and the organic solvent in the effluent. In some embodiments, the method further comprises introducing one or more analyte modifies into the passed sheath fluids of one or more sheath flow channels. In some embodiments, the method further comprises introducing one or more analyte modifiers into the passed secondary sheath fluid. The method can further comprise modifying the analyte with the analyte modifier in the exit channel. In some embodiments, the analyte modifier is a protein stain. In some embodiments, sheath fluid is passed through one or more sheath flow channels using a pump. In some embodiments, the secondary sheath fluid is passed through the secondary sheath flow channel using a pump.

In some embodiments, the surface is moved laterally with respect to the exit channel using a motor. In some embodiments, the exit channel is moved laterally with respect to the surface using a motor.

In some embodiments, the primary sheath fluid comprises a material selected from the list consisting of agarose gel, acrylamide, polyacrylamide, silica particles, and combinations thereof. In some embodiments, the secondary sheath fluid comprises a material selected from the list consisting of water, sodium dodecyl sulfate, a buffer, agarose gel, acrylamide, polyacrylamide, silica particles, an organic solvent, and combinations thereof. In some embodiments, the organic solvent comprises a material selected from the list consisting of acetonitrile, dichloromethane, dichloroethane, tetrahydrofuran, ethanol, propanol, methanol, nitromethane, toluene, and combinations thereof. In some embodiments, the organic solvent comprises one or more analyte modifiers.

DETAILED DESCRIPTION

Embodiments of the present invention relate to the dispensing of material output from a microfluidic separation column. The devices and methods disclosed can use multiple sheath flows to entrain separated materials as they exit the separation column, reducing the mass transport of separated materials and sheath components into the separation channel. By reducing this undesired mass transport, the devices and methods enable the use of sheath compositions having a wider variety of components and concentrations than could otherwise be employed.

The disclosed devices and methods also can use a terminating electrode that is located on the same integrated fluidic circuit or monolithic chip as the microfluidic separation column and sheath flow channels. This on-chip electrical configuration allows for the dispensing of material, through the use of pressure-driven flow, onto non-conductive receiving surfaces or substrates. Other electric-field-dependent operations, such as injections or separations, can then be carried out independently of the fluid properties of the sheath flow or the electrical properties of the receiving substrate. Greater ranges of sheath flow rates and receiving substrate compositions and configurations allow the methods and devices to be applied to different sample blotting or collecting techniques. As such, the devices and methods can be used, for example, in immunoblotting, immunoassays, western blot analyses, electrophoresis, chromatography, fraction collection, or other related technologies.

Figure 1:
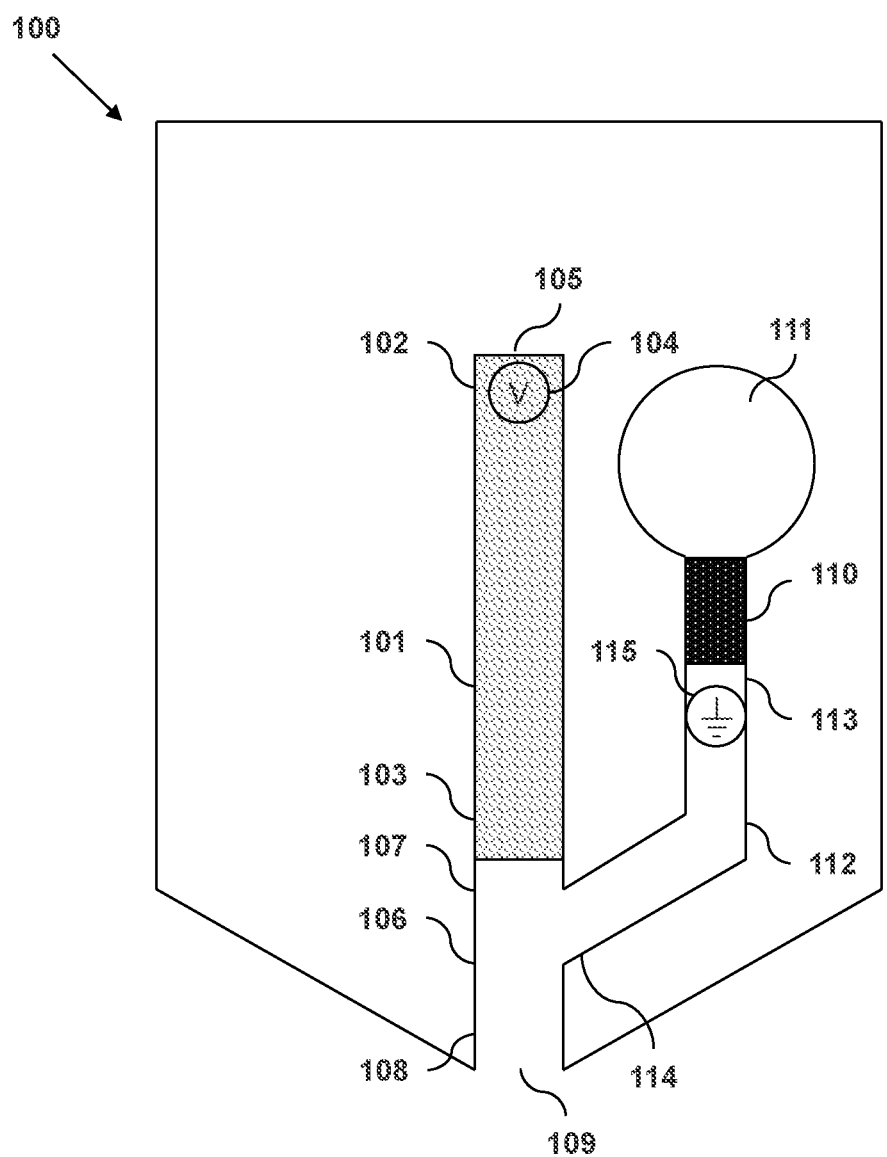
FIG. 1 illustrates a microfluidic separation and dispensing device in accordance with an embodiment and having a primary sheath flow channel with a pressure source and a terminating electrode.

FIG. 1 illustrates a microfluidic separation and dispensing device in accordance with an embodiment. Shown in device 100 is a separation column 101 having an input end 102 and an output end 103. A first electrode 104 is located within the separation column 101 proximate to the input end 102. The input end 102 has an opening 105. The output end 103 is connected to an exit channel 106 having an upstream end 107 and a downstream end 108. The downstream end 108 of the exit channel 106 has a discharge outlet 109. Also shown is a pressure source 110 that is connected to a primary sheath fluid reservoir 111. A primary sheath flow channel 112 connects the primary sheath fluid reservoir 111 to the exit channel 106. The primary sheath flow channel 112 has an entrance end 113 and an intersecting end 114. A second electrode 115 is located within the primary sheath flow channel 112.

The separation column 101 can be formed from, for example, plastic or fused silica. In some embodiments, the diameters of the input 102 and output 103 ends of the separation column are in a range from about 5 µm to about 500 µm. In some embodiments, the diameters of the input and output ends are about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameters of the input and/or output ends can be, for example and without limitation, within the range between 1 µm and 60 µm, between 2 µm and 130 µm, between 4 µm and 250 µm, between 8 µm and 500 µm, or between 15 µm and 1000 µm. The diameters of the input and/or output ends can be within the range between 5 µm and 80 µm, between 8 µm and 125 µm, between 12 µm and 200 µm, between 20 µm and 325 µm, or between 30 µm and 500 µm.

The first 104 and second 115 electrodes can be formed from any conducting or semiconducting material. For example, one or both or the electrodes can comprise a metal. In some embodiments, the metal is gold or platinum. In some embodiments, one or both of the electrodes are platinum or can be platinum-plated. One or both of the electrodes can be substantially cylindrical in shape, as in a wire. One or both of the electrodes can be substantially flattened in shape so as to increase their surface area.

The exit channel 106 can have a substantially constant cross-sectional diameter along its length from the upstream end 107 to the downstream end 108. The exit channel can be tapered such that the cross-sectional diameter of the exit channel proximate to the discharge outlet 109 is smaller than the cross-sectional area of the exit channel proximate to the output end 103 of the separation column 101. In some embodiments, the entire internal region of the exit channel is tapered. In some embodiments, only the portion of the exit region proximate to the discharge outlet is tapered. The tapering can be such that the cross-sectional area of the exit channel decreases linearly along the longitudinal axis of the exit channel. The tapering can be such that cross-sectional area of the exit channel decreases nonlinearly along the longitudinal axis of the exit channel.

The diameter of the discharge outlet 109 can be larger than, equal to, or smaller than the diameter of the output end 103 of the separation column 101. In some embodiments, the diameter of the discharge outlet is in the range from about 5 µm to about 500 µm. In some embodiments, the diameter of the discharge outlet is about 1 µm, 5 µm, 10 µm, 20 µm, 30 µm, 40 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or µm, 1000 µm. The µm, diameter µm, of μm, the μm, discharge outlet can be, for example and without limitation, within the range between 1 μm and 60 μm, between 2 μm and 130 μm, between 4 μm and 250 μm, between 8 μm and 500 μm, or between 15 μm and 1000 μm. The diameter of the discharge outlet can be within the range between 5 μm and 80 μm, between 8 μm and 125 between 12 μm and 200 μm, between 20 μm and 325 μm, or between 30 μm and 500 μm.

The primary sheath fluid reservoir 111 can have a volume of less than 10 ml, less than 6.5 ml, less than 4 ml, less than 2.5 ml, less than 1.5 ml, less than 1 ml, less than 650 μl, less than 400 μl, less than 250 μl, less than 150 μl, less than 100 μl, less than 65 μl, less than 40 μl, less than 25 μl, less than 15 μl, or less than 10 μl. The primary sheath fluid reservoir can, for example and without limitation, have a volume within the range between 10 μl and 650 μl, between 20 μl, and 1.25 ml, between 40 μl, and 2.5 ml, between 80 μl, and 5 ml, or between 150 μl, and 10 ml.

The pressure source 110 can be an impulsive pump having a deformable surface. The deformable surface can be configured to expand, to contract, or both. The movement of the deformable surface alters the volume of the pump internal region. As the volume of the pump internal region decreases, the pressure of material within the pump internal region increases. In this way, the pump can affect pressure-driven flow of material through the primary sheath flow channel 112.

The impulsive pump can comprise a piezoelectric material. In some embodiments, the impulsive pump comprises a piezoelectric crystal. In some embodiments, the impulsive pump comprises lead zirconate titanate. The impulsive pump can comprise a thermoresistive material. The impulsive pump can be electrically connected to an impulsive pump actuator. In some embodiments, the impulsive pump actuator can transmit a signal to the impulsive pump causing it to expand.

The primary sheath flow channel 112 can be formed from, for example, plastic or fused silica. In some embodiments, the diameters of the entrance 113 and intersecting 114 ends of the flow channel are in a range from about 5 μm to about 500 μm. In some embodiments, the diameters of the input and output ends are about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameters of the input and/or output ends can be, for example and without limitation, within the range between 1 μm and 60 μm, between 2 μm and 130 μm, between 4 μm and 250 μm, between 8 μm and 500 μm, or between 15 μm and 1000 μm. The diameter of the input and/or output ends can be within the range between 5 μm and 80 μm, between 8 μm and 125 μm, between 12 μm and 200 μm, between 20 μm and 325 μm, or between 30 μm and 500 μm.

Figure 2:
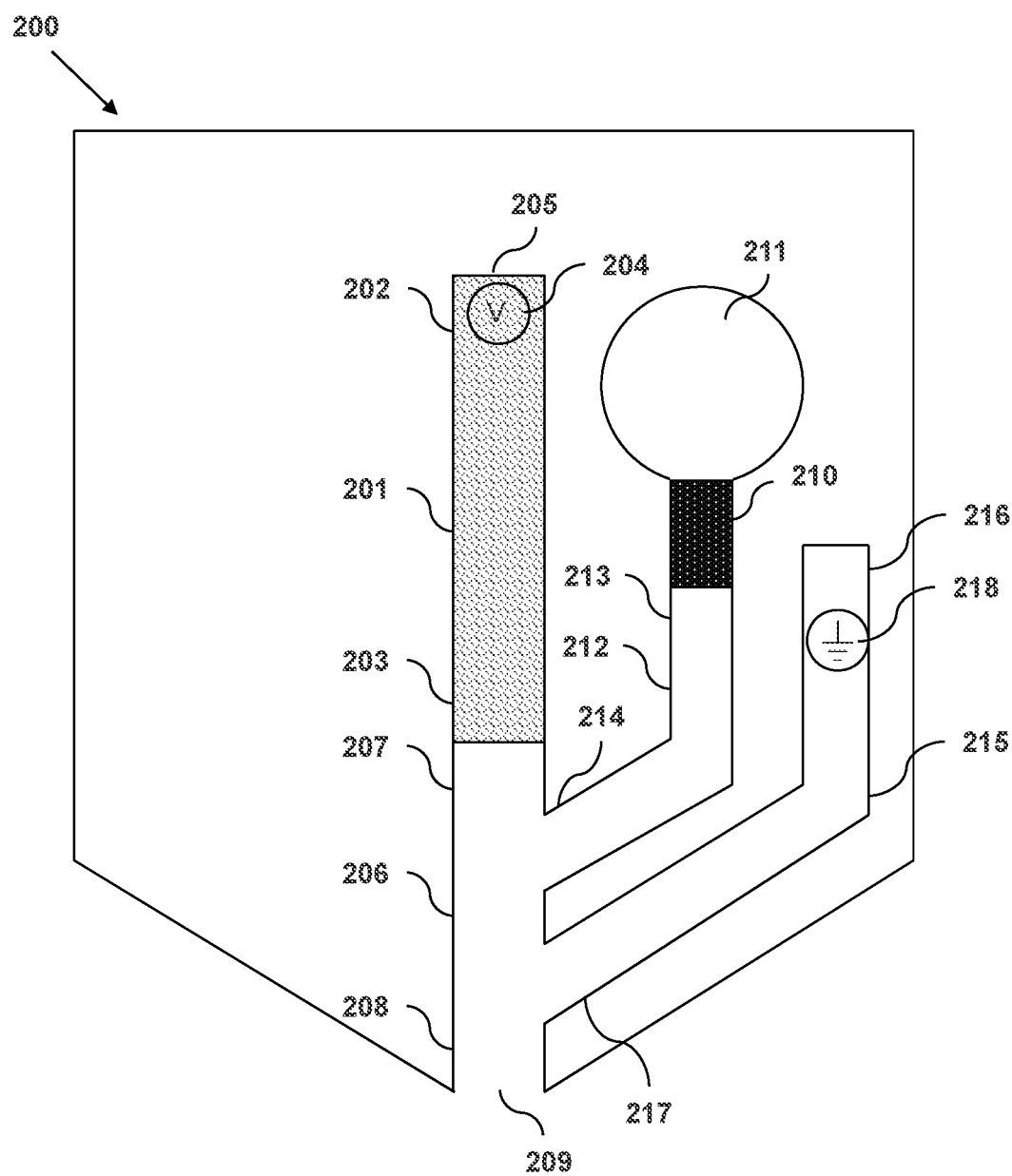
FIG. 2 illustrates a microfluidic separation and dispensing device in accordance with an embodiment and having a primary sheath flow channel with a pressure source and a secondary sheath flow channel with a terminating electrode, wherein the secondary sheath flow channel intersects an exit channel.

FIG. 2 illustrates another microfluidic separation and dispensing device in accordance with an embodiment. Shown in device 200 is a separation column 201 having an input end 202 and an output end 203. A first electrode 204 is located within the separation column 201 proximate to the input end 202. The input end 202 has an opening 205. The output end 203 is connected to an exit channel 206 having an upstream end 207 and a downstream end 208. The downstream end 208 of the exit channel 206 has a discharge outlet 209. Also shown is a pressure source 210 that is connected to a primary sheath fluid reservoir 211. A primary sheath flow channel 212 connects the primary sheath fluid reservoir 211 to the exit channel 206. The primary sheath flow channel 212 has a primary sheath flow entrance end 213 and a primary sheath flow intersecting end 214. Also shown is a secondary sheath flow channel 215 having an secondary sheath flow entrance end 216 and a secondary sheath flow intersecting end 217. The intersecting end 217 of the secondary sheath flow channel 215 intersects the exit channel 206 at a location between the exit channel discharge outlet 209 and the intersection of the primary sheath flow channel 212 and the exit channel 206. A second electrode 218 is located within the secondary sheath flow channel 215.

The separation column 201 can be formed from, for example, plastic or fused silica. In some embodiments, the diameters of the input 202 and output 203 ends of the separation column are in a range from about 5 μm to about 500 μm. In some embodiments, the diameters of the input and output ends are about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameters of the input and/or output ends can be, for example and without limitation, within the range between 1 μm and 60 μm, between 2 μm and 130 μm, between 4 μm and 250 μm, between 8 μm and 500 μm, or between 15 μm and 1000 μm. The diameter of the input and/or output ends can be within the range between 5 μm and 80 μm, between 8 μm and 125 μm, between 12 μm and 200 μm, between 20 μm and 325 μm, or between 30 μm and 500 μm.

The first 204 and second 218 electrodes can be formed from any conducting or semiconducting material. For example, one or both or the electrodes can comprise a metal. In some embodiments, the metal is gold or platinum. In some embodiments, one or both of the electrodes are platinum or can be platinum-plated. One or both of the electrodes can be substantially cylindrical in shape, as in a wire. One or both of the electrodes can be substantially flattened in shape so as to increase their surface area.

The exit channel 206 can have a substantially constant cross-sectional diameter along its length from the upstream end 207 to the downstream end 208. The exit channel can be tapered such that the cross-sectional diameter of the exit channel proximate to the discharge outlet 209 is smaller than the cross-sectional area of the exit channel proximate to the output end 203 of the separation column 201. In some embodiments, the entire internal region of the exit channel is tapered. In some embodiments, only the portion of the exit region proximate to the discharge outlet is tapered. The tapering can be such that the cross-sectional area of the exit channel decreases linearly along the longitudinal axis of the exit channel. The tapering can be such that cross-sectional area of the exit channel decreases nonlinearly along the longitudinal axis of the exit channel.

The diameter of the discharge outlet 209 can be larger than, equal to, or smaller than the diameter of the output end 203 of the separation column 201. In some embodiments, the diameter of the discharge outlet is in the range from about 5 μm to about 500 In some embodiments, the diameter of the nozzle outlet is about 1 μm, 5 μm, 10 μm, 20 μm, 30 μm, 40 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameter of the nozzle outlet can be, for example and without limitation, within the range between 1 μm and 60 μm, between 2 μm and 130 μm, between 4 μm and 250 μm, between 8 μm and 500 μm or between 15 μm and 1000 μm. The diameter of the nozzle outlet can be within the range between 5 μm and between 8 μm and 125 μm, between 12 μm and 200 μm, between 20 μm and 325 μm, or between 30 μm and 500 μm.

The primary sheath fluid reservoir 211 can have a volume of less than 10 ml, less than 6.5 ml, less than 4 ml, less than 2.5 ml, less than 1.5 ml, less than 1 ml, less than 650 μl, less than 400 μl, less than 250 μl, less than 150 μl, less than 100 μl, less than 65 μl, less than 40 μl, less than 25 μl, less than 15 μl, or less than 10 μl. The primary sheath fluid reservoir can, for example and without limitation, have a volume within the range between 10 μl and 650 μl, between 20 μl and 1.25 ml, between 40 μl and 2.5 ml, between 80 μl and 5 ml, or between 150 μl and 10 ml. In some embodiments, the primary sheath fluid is an electrophoresis buffer. In some embodiments, the primary sheath fluid is a sieving gel.

The pressure source 210 can be an impulsive pump having a deformable surface. The deformable surface can be configured to expand, to contract, or both. The movement of the deformable surface alters the volume of the pump internal region. As the volume of the pump internal region decreases, the pressure of material within the pump internal region increases. In this way, the pump can affect pressure-driven flow of material through the primary sheath flow channel 212.

The impulsive pump can comprise a piezoelectric material. In some embodiments, the impulsive pump comprises a piezoelectric crystal. In some embodiments, the impulsive pump comprises lead zirconate titanate. The impulsive pump can comprise a thermoresistive material. The impulsive pump can be electrically connected to an impulsive pump actuator. In some embodiments, the impulsive pump actuator can transmit a signal to the impulsive pump causing it to expand.

The primary 212 and secondary 215 sheath flow channels can be formed from, for example, plastic or fused silica. In some embodiments, the diameters of the entrance 213, 216 and intersecting 214, 217 ends of the flow channel are in a range from about 5 μm to about 500 μm. In some embodiments, the diameters of the input and output ends are about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210

μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameters of the input and/or output ends can be, for example and without limitation, within the range between 1 μm and 60 μm, between 2 μm and 130 μm, between 4 μm and 250 μm, between 8 μm and 500 μm, or between 15 μm and 1000 μm. The diameter of the input and/or output ends can be within the range between 5 μm and 80 μm, between 8 μm and 125 μm, between 12 μm and 200 μm, between 20 μm and 325 μm, or between 30 μm and 500 μm.

In some embodiments, the pressure source 210 is a first pressure source and the device further comprises a second pressure source connected to the secondary sheath flow channel 215. In these embodiments, pressure-driven flow can be independently applied to each of the primary 212 and secondary sheath flow channels.

Figure 3:
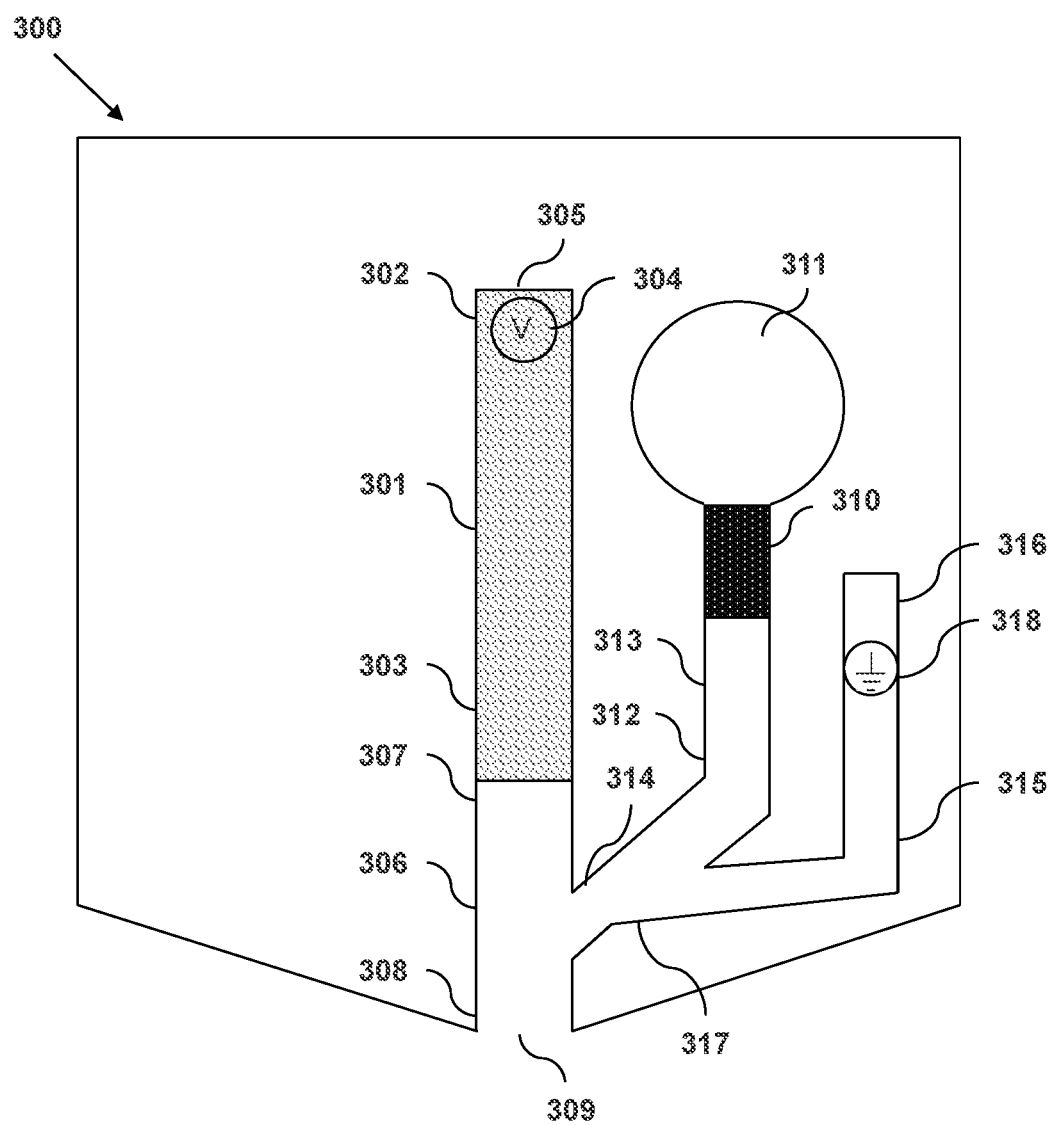
FIG. 3 illustrates a microfluidic separation and dispensing device in accordance with an embodiment and having a primary sheath flow channel with a pressure source and a secondary sheath flow channel with a terminating electrode, wherein the secondary sheath flow channel intersects the primary sheath flow channel.

FIG. 3 illustrates an another microfluidic separation and dispensing device in accordance with an embodiment. Shown in device 300 is a separation column 301 having an input end 302 and an output end 303. A first electrode 304 is located within the separation column 301 proximate to the input end 302. The input end 302 has an opening 305. The output end 303 is connected to an exit channel 306 having an upstream end 307 and a downstream end 308. The downstream end 308 of the exit channel 306 has a discharge outlet 309. Also shown is a pressure source 310 that is connected to a primary sheath fluid reservoir 311. A primary sheath flow channel 312 connects the primary sheath fluid reservoir 311 to the exit channel 306. The primary sheath flow channel 312 has a primary sheath flow entrance end 313 and a primary sheath flow intersecting end 314. Also shown is a secondary sheath flow channel 315 having an secondary sheath flow entrance end 316 and a secondary sheath flow intersecting end 317. The intersecting end 317 of the secondary sheath flow channel 315 intersects the primary sheath flow channel 312. A second electrode 318 is located within the secondary sheath flow channel 315.

The separation column 301 can be formed from, for example, plastic or fused silica. In some embodiments, the diameters of the input 302 and output 303 ends of the separation column are in a range from about 5 μm to about 500 μm. In some embodiments, the diameters of the input and output ends are about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameters of the input and/or output ends can be, for example and without limitation, within the range between 1 μm and 60 μm, between 2 μm and 130 μm, between 4 μm and 250 μm, between 8 μm and 500 μm, or between 15 μm and 1000 μm. The diameter of the input and/or output ends can be within the range between 5 μm and 80 μm, between 8 μm and 125 μm, between 12 μm and 200 μm, between 20 μm and 325 μm, or between 30 μm and 500 μm.

The first 304 and second 318 electrodes can be formed from any conducting or semiconducting material. For example, one or both or the electrodes can comprise a metal. In some embodiments, the metal is gold or platinum. In some embodiments, one or both of the electrodes are platinum or can be platinum-plated. One or both of the electrodes can be substantially cylindrical in shape, as in a wire. One or both of the electrodes can be substantially flattened in shape so as to increase their surface area.

The exit channel 306 can have a substantially constant cross-sectional diameter along its length from the upstream end 307 to the downstream end 308. The exit channel can be tapered such that the cross-sectional diameter of the exit channel proximate to the discharge outlet 309 is smaller than the cross-sectional area of the exit channel proximate to the output end 303 of the separation column 301. In some embodiments, the entire internal region of the exit channel is tapered. In some embodiments, only the portion of the exit region proximate to the discharge outlet is tapered. The tapering can be such that the cross-sectional area of the exit channel decreases linearly along the longitudinal axis of the exit channel. The tapering can be such that cross-sectional area of the exit channel decreases nonlinearly along the longitudinal axis of the exit channel.

The diameter of the discharge outlet 309 can be larger than, equal to, or smaller than the diameter of the output end 303 of the separation column 301. In some embodiments, the diameter of the discharge outlet is in the range from about 5 μm to about 500 In some embodiments, the diameter of the nozzle outlet is about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameter of the nozzle outlet can be, for example and without limitation, within the range between 1 μm and 60 between 2 μm and 130 μm, between 4 μm and 250 μm, between 8 μm and 500 μm, or between 15 μm and 1000 μm. The diameter of the nozzle outlet can be within the range between 5 μm and between 8 μm and 125 μm, between 12 μm and 200 μm, between 20 μm and 325 μm, or between 30 μm and 500 μm.

The primary sheath fluid reservoir 311 can have a volume of less than 10 ml, less than 6.5 ml, less than 4 ml, less than 2.5 ml, less than 1.5 ml, less than 1 ml, less than 650 μl, less than 400 μl less than 250 μl, less than 150 μl, less than 100 μl, less than 65 μl, less than 40 μl, less than 25 μl, less than 15 μl, or less than 10 μl. The primary sheath fluid reservoir can, for example and without limitation, have a volume within the range between 10 μl and 650 μl, between 20 μl and 1.25 ml, between 40 μl and 2.5 ml, between 80 μl and 5 ml, or between 150 μl and 10 ml.

The pressure source 310 can be an impulsive pump having a deformable surface. The deformable surface can be configured to expand, to contract, or both. The movement of the deformable surface alters the volume of the pump internal region. As the volume of the pump internal region decreases, the pressure of material within the pump internal region increases. In this way, the pump can affect pressure-driven flow of material through the primary sheath flow channel 312.

The impulsive pump can comprise a piezoelectric material. In some embodiments, the impulsive pump comprises a piezoelectric crystal. In some embodiments, the impulsive pump comprises lead zirconate titanate. The impulsive pump can comprise a thermoresistive material. The impulsive pump can be electrically connected to an impulsive pump actuator. In some embodiments, the impulsive pump actuator can transmit a signal to the impulsive pump causing it to expand.

The primary 312 and secondary 315 sheath flow channels can be formed from, for example, plastic or fused silica. In some embodiments, the diameters of the entrance 313, 316 and intersecting 314, 317 ends of the flow channel are in a range from about 5 µm to about 500 µm. In some embodiments, the diameters of the input and output ends are about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameters of the input and/or output ends can be, for example and without limitation, within the range between 1 µm and 60 µm, between 2 µm and 130 µm, between 4 µm and 250 µm, between 8 µm and 500 µm, or between 15 µm and 1000 µm. The diameter of the input and/or output ends can be within the range between 5 µm and 80 µm, between 8 µm and 125 µm, between 12 µm and 200 µm, between 20 µm and 325 µm, or between 30 µm and 500 µm.

In some embodiments, the pressure source 310 is a first pressure source and the device further comprises a second pressure source connected to the secondary sheath flow channel 315. In these embodiments, pressure-driven flow can be independently applied to each of the primary 312 and secondary sheath flow channels.

Figure 4:
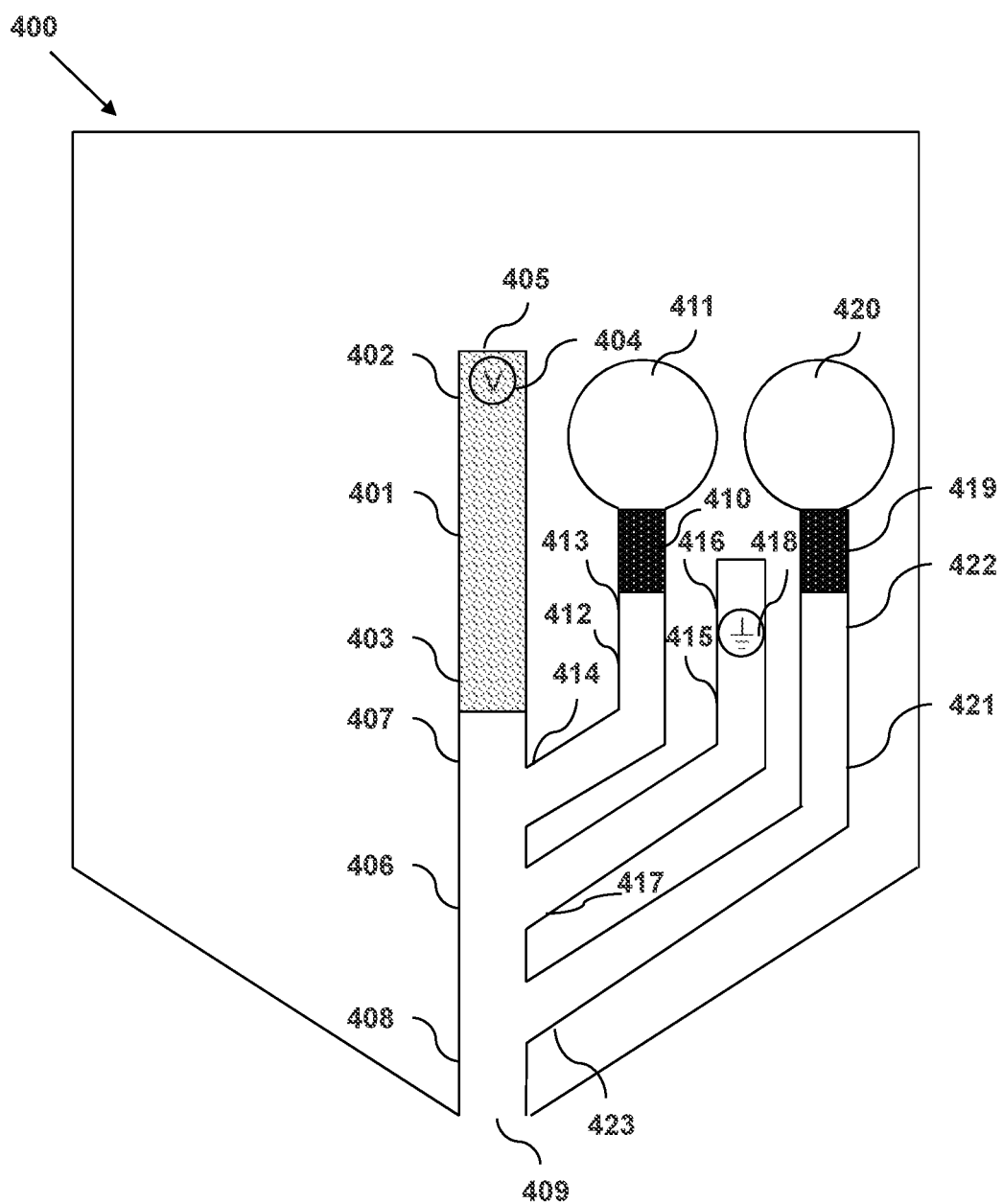
FIG. 4 illustrates a microfluidic separation and dispensing device in accordance with an embodiment and having a primary sheath flow channel with a first pressure source, a secondary sheath flow channel with a terminating electrode, and a tertiary sheath flow channel with a second pressure source, wherein the secondary sheath flow channel intersects an exit channel.

FIG. 4 illustrates another microfluidic separation and dispensing device in accordance with an embodiment. Shown in device 400 is a separation column 401 having an input end 402 and an output end 403. A first electrode 404 is located within the separation column 401 proximate to the input end 402. The input end 402 has an opening 405. The output end 403 is connected to an exit channel 406 having an upstream end 407 and a downstream end 408. The downstream end 408 of the exit channel 406 has a discharge outlet 409. Also shown is a first pressure source 410 that is connected to a primary sheath fluid reservoir 411. A primary sheath flow channel 412 connects the primary sheath fluid reservoir 411 to the exit channel 406. The primary sheath flow channel 412 has a primary sheath flow entrance end 413 and a primary sheath flow intersecting end 414. Also shown is a secondary sheath flow channel 415 having an secondary sheath flow entrance end 416 and a secondary sheath flow intersecting end 417. The intersecting end 417 of the secondary sheath flow channel 415 intersects the exit channel 406 at a location between the exit channel discharge outlet 409 and the intersection of the primary sheath flow channel 412 and the exit channel 406. A second electrode 418 is located within the secondary sheath flow channel 415. Also shown is a second pressure source 419 that is connected to an organic solvent reservoir 420. A tertiary sheath flow channel 421 connects the primary sheath fluid reservoir 420 to the exit channel 406. The tertiary sheath flow channel 421 has a tertiary sheath flow entrance end 422 and a tertiary sheath flow intersecting end 423.

The separation column 401 can be formed from, for example, plastic or fused silica. In some embodiments, the diameters of the input 402 and output 403 ends of the separation column are in a range from about 5 µm to about 500 µm. In some embodiments, the diameters of the input and output ends are about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameters of the input and/or output ends can be, for example and without limitation, within the range between 1 µm and 60 µm, between 2 µm and 130 µm, between 4 µm and 250 µm, between 8 µm and 500 µm, or between 15 µm and 1000 µm. The diameter of the input and/or output ends can be within the range between 5 µm and 80 µm, between 8 µm and 125 µm, between 12 µm and 200 µm, between 20 µm and 325 µm, or between 30 µm and 500 µm.

The first 404 and second 418 electrodes can be formed from any conducting or semiconducting material. For example, one or both or the electrodes can comprise a metal. In some embodiments, the metal is gold or platinum. In some embodiments, one or both of the electrodes are platinum or can be platinum-plated. One or both of the electrodes can be substantially cylindrical in shape, as in a wire. One or both of the electrodes can be substantially flattened in shape so as to increase their surface area.

The exit channel 406 can have a substantially constant cross-sectional diameter along its length from the upstream end 407 to the downstream end 408. The exit channel can be tapered such that the cross-sectional diameter of the exit channel proximate to the discharge outlet 409 is smaller than the cross-sectional area of the exit channel proximate to the output end 403 of the separation column 401. In some embodiments, the entire internal region of the exit channel is tapered. In some embodiments, only the portion of the exit region proximate to the discharge outlet is tapered. The tapering can be such that the cross-sectional area of the exit channel decreases linearly along the longitudinal axis of the exit channel. The tapering can be such that cross-sectional area of the exit channel decreases nonlinearly along the longitudinal axis of the exit channel.

The diameter of the discharge outlet 409 can be larger than, equal to, or smaller than the diameter of the output end 403 of the separation column 401. In some embodiments, the diameter of the discharge outlet is in the range from about 5 µm to about 500 µm. In some embodiments, the diameter of the nozzle outlet is about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameter of the nozzle outlet can be, for example and without limitation, within the range between 1 µm and 60 µm, between 2 µm and 130 µm, between 4 µm and 250 µm, between 8 µm and 500 µm, or between 15 µm and 1000 µm. The diameter of the nozzle outlet can be within the range between 5 µm and between 8 µm and 125 µm, between 12 µm and 200 µm, between 20 µm and 325 µm, or between 30 µm and 500 µm.

The primary sheath fluid reservoir 411 and the organic solvent reservoir 420 can each independently have a volume of less than 10 ml, less than 6.5 ml, less than 4 ml, less than 2.5 ml, less than 1.5 ml, less than 1 ml, less than 650 µl, less than 400 µl less than 250 µl, less than 150 µl, less than 100 µl, less than 65 µl, less than 40 µl, less than 25 µl, less than 15 µl, or less than 10 µl. The primary sheath fluid and/or organic solvent reservoirs can, for example and without limitation, have a volume within the range between 10 µl and 650 µl, between 20 µl and 1.25 ml, between 40 µl and 2.5 ml, between 80 µl and 5 ml, or between 150 µl and 10 ml.

The first 410 and second 419 pressure sources can each independently be an impulsive pump having a deformable surface. The deformable surface can be configured to expand, to contract, or both. The movement of the deformable surface alters the volume of the pump internal region. As the volume of the pump internal region decreases, the pressure of material within the pump internal region increases. In this way, the first pump can affect pressure-driven flow of material through the primary sheath flow channel 412, and the second pump can affect pressure-driven flow of material through the tertiary sheath flow channel 421.

The impulsive first and second pumps can each comprise a piezoelectric material. In some embodiments, the impulsive pumps comprise piezoelectric crystals. In some embodiments, the impulsive pumps comprise lead zirconate titanate. The impulsive pumps can comprise a thermoresistive material. The impulsive pumps can be electrically connected to impulsive pump actuators. In some embodiments, the impulsive pump actuators can transmit signals to the impulsive pumps causing them to expand.

The primary 412, secondary 415, and tertiary 421 sheath flow channels can be formed from, for example, plastic or fused silica. In some embodiments, the diameters of the entrance 413, 416, 422 and intersecting 414, 417, 423 ends of the flow channels are in a range from about 5 µm to about 500 µm. In some embodiments, the diameters of the input and output ends are about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameters of the input and/or output ends can be, for example and without limitation, within the range between 1 µm and 60 µm, between 2 µm and 130 µm, between 4 µm and 250 µm, between 8 µm and 500 µm, or between 15 µm and 1000 µm. The diameter of the input and/or output ends can be within the range between 5 µm and 80 µm, between 8 µm and 125 µm, between 12 µm and 200 µm, between 20 µm and 325 µm, or between 30 µm and 500 µm.

In some embodiments, the device further comprises a third pressure source connected to the secondary sheath flow channel 415. In these embodiments, pressure-driven flow can be independently applied to each of the primary 412, secondary, and tertiary 421 sheath flow channels.

Figure 5:
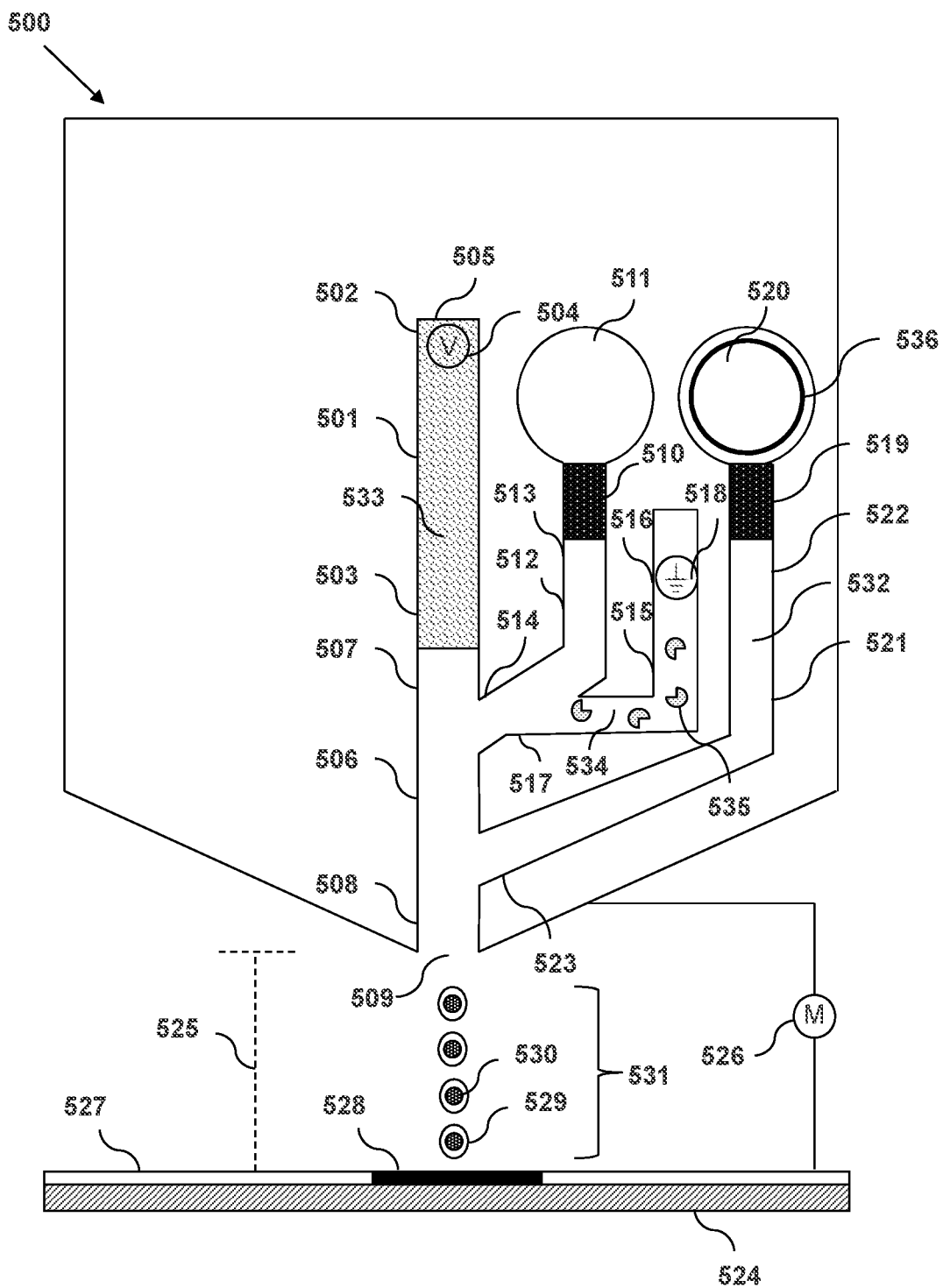
FIG. 5 illustrates a microfluidic separation and dispensing device in accordance with an embodiment and having a primary sheath flow channel with a first pressure source, a secondary sheath flow channel with a terminating electrode, and a tertiary sheath flow channel with a second pressure source, wherein the secondary sheath flow channel intersects the primary sheath flow channel.

FIG. 5 illustrates another microfluidic separation and dispensing device in accordance with an embodiment. Shown in device 500 is a separation column 501 having an input end 502 and an output end 503. A first electrode 504 is located within the separation column 501 proximate to the input end 502. The input end 502 has an opening 505. The output end 503 is connected to an exit channel 506 having an upstream end 507 and a downstream end 508. The downstream end 508 of the exit channel 506 has a discharge outlet 509. Also shown is a first pressure source 510 that is connected to a primary sheath fluid reservoir 511. A primary sheath flow channel 512 connects the primary sheath fluid reservoir 511 to the exit channel 506. The primary sheath flow channel 512 has a primary sheath flow entrance end 513 and a primary sheath flow intersecting end 514. Also shown is a secondary sheath flow channel 515 having an secondary sheath flow entrance end 516 and a secondary sheath flow intersecting end 517. The intersecting end 517 of the secondary sheath flow channel 515 intersects the primary sheath flow channel 512. A second electrode 518 is located within the secondary sheath flow channel 515. Also shown is a second pressure source 519 that is connected to an organic solvent reservoir 520. A tertiary sheath flow channel 521 connects the primary sheath fluid reservoir 520 to the exit channel 506. The tertiary sheath flow channel 521 has a tertiary sheath flow entrance end 522 and a tertiary sheath flow intersecting end 523.

The separation column 501 can be formed from, for example, plastic or fused silica. In some embodiments, the diameters of the input 502 and output 503 ends of the separation column are in a range from about 5 µm to about 500 µm. In some embodiments, the diameters of the input and output ends are about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameters of the input and/or output ends can be, for example and without limitation, within the range between 1 µm and 60 µm, between 2 µm and 130 µm, between 4 µm and 250 µm, between 8 µm and 500 µm, or between 15 µm and 1000 µm. The diameter of the input and/or output ends can be within the range between 5 µm and 80 µm, between 8 µm and 125 µm, between 12 µm and 200 µm, between 20 µm and 325 µm, or between 30 µm and 500 µm.

The first 504 and second 518 electrodes can be formed from any conducting or semiconducting material. For example, one or both or the electrodes can comprise a metal. In some embodiments, the metal is gold or platinum. In some embodiments, one or both of the electrodes are platinum or can be platinum-plated. One or both of the electrodes can be substantially cylindrical in shape, as in a wire. One or both of the electrodes can be substantially flattened in shape so as to increase their surface area.

The exit channel 506 can have a substantially constant cross-sectional diameter along its length from the upstream end 507 to the downstream end 508. The exit channel can be tapered such that the cross-sectional diameter of the exit channel proximate to the discharge outlet 509 is smaller than the cross-sectional area of the exit channel proximate to the output end 503 of the separation column 501. In some embodiments, the entire internal region of the exit channel is tapered. In some embodiments, only the portion of the exit region proximate to the discharge outlet is tapered. The tapering can be such that the cross-sectional area of the exit channel decreases linearly along the longitudinal axis of the exit channel. The tapering can be such that cross-sectional area of the exit channel decreases nonlinearly along the longitudinal axis of the exit channel.

The diameter of the discharge outlet 509 can be larger than, equal to, or smaller than the diameter of the output end 503 of the separation column 501. In some embodiments, the diameter of the discharge outlet is in the range from about 5 µm to about 500 µm. In some embodiments, the diameter of the nozzle outlet is about 1 µm, 5 µm, 10 µm, 20 µm, 30 µm, 40 µm, 50 µm, 60 µm, 70 µm, 80 µm, 90 µm, 100

μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameter of the nozzle outlet can be, for example and without limitation, within the range between 1 μm and 60 μm, between 2 μm and 130 μm, between 4 μm and 250 μm, between 8 μm and 500 μm, or between 15 μm and 1000 μm. The diameter of the nozzle outlet can be within the range between 5 μm and 80 μm, between 8 μm and 125 μm, between 12 μm and 200 μm, between 20 μm and 325 μm, or between 30 μm and 500 μm.

The primary sheath fluid reservoir 511 and the organic solvent reservoir 520 can each independently have a volume of less than 10 ml, less than 6.5 ml, less than 4 ml, less than 2.5 ml, less than 1.5 ml, less than 1 ml, less than 650 μl, less than 400 μl less than 250 μl, less than 150 μl, less than 100 less than 65 less than 40 μl, less than 25 less than 15 or less than 10 μl. The primary sheath fluid and/or organic solvent reservoirs can, for example and without limitation, have a volume within the range between 10 μl and 650 μl, between 20 μl and 1.25 ml, between 40 μl and 2.5 ml, between 80 μl and 5 ml, or between 150 μl and 10 ml.

The first 510 and second 519 pressure sources can each independently be an impulsive pump having a deformable surface. The deformable surface can be configured to expand, to contract, or both. The movement of the deformable surface alters the volume of the pump internal region. As the volume of the pump internal region decreases, the pressure of material within the pump internal region increases. In this way, the first pump can affect pressure-driven flow of material through the primary sheath flow channel 512, and the second pump can affect pressure-driven flow of material through the tertiary sheath flow channel 521.

The impulsive first and second pumps can each comprise a piezoelectric material. In some embodiments, the impulsive pumps comprise piezoelectric crystals. In some embodiments, the impulsive pumps comprise lead zirconate titanate. The impulsive pumps can comprise a thermoresistive material. The impulsive pumps can be electrically connected to impulsive pump actuators. In some embodiments, the impulsive pump actuators can transmit signals to the impulsive pumps causing them to expand.

The primary 512, secondary 515, and tertiary 521 sheath flow channels can be formed from, for example, plastic or fused silica. In some embodiments, the diameters of the entrance 513, 516, 522 and intersecting 514, 517, 523 ends of the flow channels are in a range from about 5 μm to about 500 μm. In some embodiments, the diameters of the input and output ends are about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameters of the input and/or output ends can be, for example and without limitation, within the range between 1 μm and 60 μm, between 2 μm and 130 μm, between 4 μm and 250 μm, between 8 μm and 500 μm, or between 15 μm and 1000 μm. The diameter of the input and/or output ends can be within the range between 5 μm and 80 μm, between 8 μm and 125 μm, between 12 μm and 200 μm, between 20 μm and 325 μm, or between 30 μm and 500 μm.

In some embodiments, the device further comprises a third pressure source connected to the secondary sheath flow channel 515. In these embodiments, pressure-driven flow can be independently applied to each of the primary 512, secondary, and tertiary 521 sheath flow channels.

Any of the devices described above can further comprise a surface 524 positioned across from the discharge outlet. In some embodiments, the surface comprises an electrically insulating material. In some embodiments, the surface comprises an electrically conductive material. In some embodiments, the surface comprises a hydrophilic material. In some embodiments, the surface comprises a hydrophobic material.

In some embodiments, the surface is wet. In some embodiments, the surface is dry. The use of a dry surface can be advantageous for multiple reasons. One advantage of a dry surface is the elimination of any operating complexities associated with the maintaining of a consistently wet membrane. Another advantage is that a dry membrane can provides a capillary, or "wicking", force as an effluent exits the discharge outlet. As discussed below, this can assist with immobilization of proteins or other analytes. In some embodiments, a vacuum is connected to the surface. The vacuum can be a vacuum manifold. The vacuum can be configured to pull (e.g., wick) the effluent into the membrane. The vacuum can be configured to hold a membrane to the surface such that an analyte in the effluent is immobilized in the membrane.

In some embodiments, the discharge outlet contacts the surface. In some embodiments, the surface is positioned across a gap 525 from the discharge outlet and the discharge outlet does not contact the surface. Because the terminating electrode is located in the flow channels of the device, there is not an electrical requirement for the surface, and the surface and an effluent exiting from the discharge outlet do not require continuous electrical contact. The surface can now be a dry membrane, plastic, glass, etc. In some embodiments, the surface is located about 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm from the discharge outlet. The gap between the surface and the discharge outlet can be, for example and without limitation, within the range between 0.1 mm and 6 mm, between 0.2 mm and 12 mm, between 0.4 mm and 25 mm, between 0.8 mm and 50 mm, or between 2 mm and 100 mm.

In some embodiments, the surface is a component of a fraction collection device. In some embodiments, the surface is located within a well of a microwell plate. The microwell plate can comprise an array of a plurality of wells. The number of wells arrayed on the microwell plate can be, for example, 6, 24, 96, 384, 1536, 3456, or 9600, or more.

Any of the devices described above can further comprise one or more motors 526. The motors can be configured to move the surface laterally with respect to the discharge outlet. The motors can be configured to move the discharge outlet laterally with respect to the surface. The motors can be, for example, stepper motors, small brushed direct current (DC) motors, or brushless DC motors. The motors can be elements of a robotic apparatus that is programmed or otherwise configured to automate and/or regulate the operation of the motors. Movement can be continuous or semi-continuous. Movement can stop intermittently for sample or fraction collection.

Because the terminating electrode is located within a flow channel of the device, the discharge outlet and/or surface can be moved away from one another without interrupting the separation process. This can increase the throughput of separation and dispensing by allowing other electrical processes, such as those associated with separations or sample injections, to continue while the discharge outlet and/or surface are moved relative to one another. This also enables fraction collection operations in which an effluent stream or series of droplets is first collected in one well before the device is repositioned above an adjacent well while the separation processes continue.

Any of the device described above can further comprise a membrane 527 affixed to the surface. In some embodiments, the surface is a blotting membrane that can be useful for performing a Western immunoassay or other membrane analysis methods such as Northern blotting and Southern blotting. The method can further comprise applying a detection reagent to such a blotting membrane. The detection reagent can be an antibody such as a primary or secondary antibody.

The term "antibody" includes a polypeptide encoded by an immunoglobulin gene or functional fragments thereof that specifically binds and recognizes an antigen. Immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. The term antibody activity, or antibody function, refers to specific binding of the antibody to the antibody target.

A primary antibody will be understood by one of skill to refer to an antibody or fragment thereof that specifically binds to an analyte (e.g., substance, antigen, component) of interest. The primary antibody can further comprise a tag, e.g., for recognition by a secondary antibody or associated binding protein (e.g., green fluorescent protein, biotin, or strepavidin).

A secondary antibody refers to an antibody that specifically binds to a primary antibody. A secondary antibody can be specific for the primary antibody (e.g., specific for primary antibodies derived from a particular species) or a tag on the primary antibody (e.g., green fluorescent protein, biotin, or strepavidin). A secondary antibody can be bispecific, e.g., with one variable region specific for a primary antibody, and a second variable region specific for a bridge antigen.

Blotting membranes can comprise, for example, nitrocellulose, nylon, polyvinylidene difluoride, or combinations of one or more of these materials. The blotting membrane can further comprise a support material. The support material can be, for example, glass, plastic, metal, ceramic or other inert surface.

In some embodiments, a region 528 of the membrane immediately across from the discharge outlet is dry until wetted by an effluent 529 exiting from the discharge outlet. The effluent can be in the form of, for example, a continuous stream, a semi-continuous stream, or discrete droplets. In some embodiments, the degree of hydrophobicity of the surface affects the surface area of droplets once contacted with the surface. In general, for aqueous droplets, as the hydrophobicity of the surface increases, the contact angle of the droplets with the surface will decrease. This decreased contact angle can allow the distances between adjacent droplets on the surface to be reduced while still preventing droplets from coalescing or otherwise combining with one another. In this way, the use of a hydrophobic surface material can enable a greater concentration of distinct droplets to be dispensed onto the surface. Also, for each individual droplet, the concentration of dispensed material per unit of area of the contacted surface material will increase. In some embodiments, this increased concentration can lead to greater signal intensities for applications such as Western blotting.

In some embodiments, the surface material is selected such that adjacent droplets dispensed onto the surface remain distinct. These embodiments can generate dispensed patterns that maintain the resolution of the separation of material within the separation column and the dispensing apparatus. In some embodiments, the surface material is selected such that adjacent droplets dispensed onto the surface coalesce. Through movement of one or both of the surface and/or the dispensing apparatus during dispensing, these embodiments can generate dispensed patterns that are continuous linear or curved representations of the separation of material within the separation column.

The effluent can comprise an analyte 530. In some embodiments, the effluent is wicked into the membrane. In some embodiments, the analyte becomes immobilized in the membrane upon wicking of the effluent into the membrane. In some embodiments, the effluent is pulled toward the dry membrane until the substrate is saturated. In some embodiments, a vacuum or vacuum manifold connected to the surface is configured to pull the effluent into the membrane. The vacuum can also be configured to hold a membrane to the surface such that an analyte in the effluent is immobilized in the membrane. Therefore, for embodiments in which the surface and/or discharge outlet move relative to one another, the immobilization force may continue in membrane surface locations that are no longer directly beneath the discharge outlet. At relatively low sheath flow rates (typically <1 µl/min) the meniscus between the discharge outlet and the membrane can be narrow and recirculation zones can be minimal.

Any of the devices described above can be used to separate one or more analytes moving within the separation column. An "analyte" includes a substance of interest such as a biomolecule. Biomolecules are molecules of a type typically found in a biological system, whether such molecule is naturally occurring or the result of some external disturbance of the system (e.g., a disease, poisoning, genetic manipulation, etc.), as well as synthetic analogs and derivatives thereof. Non-limiting examples of biomolecules include amino acids (naturally occurring or synthetic), peptides, polypeptides, glycosylated and unglycosylated proteins (e.g., polyclonal and monoclonal antibodies, receptors, interferons, enzymes, etc.), nucleosides, nucleotides, oligonucleotides (e.g., DNA, RNA, PNA oligos), polynucleotides (e.g., DNA, cDNA, RNA, etc.), carbohydrates, hormones, haptens, steroids, toxins, etc. Biomolecules can be isolated from natural sources, or they can be synthetic.

The analytes can be, for example, proteins, nucleic acids, carbohydrates, lipids, or any other type of molecule. In some embodiments, the analytes are proteins that are present in the separation column in their native state. In some embodiments, the analytes are proteins that have been mixed with sodium dodecyl sulfate to cause their partial or complete denaturation.

Any of the devices described above can further comprise a third electrode wherein the surface is the third electrode. The third electrode can be formed from any conducting or semiconducting material. For example, the third electrode can comprise a metal. In some embodiments, the metal is gold or platinum. In some embodiments, the third electrode is platinum or can be platinum-plated. In some embodiments, the surface is indium tin oxide (ITO) coated glass or plastic. The third electrode can be configured to electrospray an spray mixture 531 from the discharge outlet to the surface.

To enable electrospray from the chip, the tertiary sheath can comprise an organic solvent 532 that is mixed with the effluent to form a spray mixture. The spray mixture can comprise between 5% and 95%, between 5% and 50%, 25% and 75%, between 50% and 95%, between 5% and 25%, between 10% and 30%, between 15% and 35%, between 20% and 40%, between 25% and 45%, between 30% and 50%, between 35% and 55%, between 40% and 60%, between 45% and 65%, between 50% and 70%, between 55% and 75%, between 60% and 80%, between 65% and 85%, between 70% and 90%, or between 75% and 95% organic solvent. In some embodiments, the spray mixture comprises between 20% and 80% organic solvent. The organic solvent can comprise, for example, one or more of acetone, acetonitrile, dichloromethane, dichloroethane, ethanol, methanol, nitromethane, propanol, tert-butanol, tetrahydrofuran, or toluene. In some embodiments, the organic solvent is methanol.

Any of the devices described above can further comprise a sieving gel 533. The sieving gel can be inside one or more of the separation column, the primary sheath fluid reservoir, and the primary sheath flow channel. In some embodiments, the sieving gel is inside each of the separation column, the primary sheath fluid reservoir, and the primary sheath flow channel.

Protein and DNA size-based separation techniques often rely on gels or polymer solutions to resolve populations of biomolecules. These gels and polymer solutions create a random sieving media through which the biomolecules migrate, separating the molecules by size as they pass through the media. The composition and porosity of conventional separation media can be modified to produce pores of different average sizes within the media.

The sieving gel can contain a substantially heterogeneous or substantially homogeneous assortment of pore sizes. The sieving gel can comprise nanoparticles, beads, macromolecules, a gel, a polymer solution, or other medium. The sieving gel can comprise silica nanoparticles that form a colloidal crystal, providing a separation media which has a substantially monodisperse pore size, based on the monodispersity of the silica colloid size and the crystallization of the colloids. The use of separation media comprising silica nanoparticles is further discussed in U.S. Patent Application Publication No. 2015/0279648A1, as published Oct. 1, 2015, which is entirely incorporated by reference herein for all purposes.

The sieving gel can comprise, for example, one or more of sodium dodecyl sulfate (SDS), polyvinylpyrrolidone (PVP), polyethylene oxide (PEO), polylactic acid (PLA), polyethylene glycol (PEG), polydimethylacrylamide (PDMA), acrylamide, polyacrylamide, methylcellulose, hydroxypropylmethyl cellulose (HPMC), hydroxypropyl cellulose (HPC), hydroxyethyl cellulose (HEC), agarose gel, or dextran.

Any of the above devices can further comprise a fluid 534 inside the secondary sheath flow channel. This secondary sheath fluid can have the same composition as that of the primary sheath fluid, or can have a different composition from that of the primary sheath fluid. In some embodiments, the secondary sheath fluid is the primary sheath fluid. In some embodiments, the secondary sheath fluid and primary sheath fluid are two separate fluids having the same composition. The secondary sheath fluid can have a higher viscosity than that of the primary sheath fluid or the sieving gel. The secondary sheath fluid can have a lower viscosity than that of the primary sheath fluid or the sieving gel. The secondary sheath fluid can have a substantially equal viscosity to that of the primary sheath fluid or the sieving gel. In some embodiments, the secondary sheath fluid is the sieving gel. The secondary sheath fluid can comprise one or more of water, sodium dodecyl sulfate (SDS), a buffer, agarose gel, acrylamide, polyacrylamide, silica particles, or an organic solvent.

The fluid can comprise one or more analyte modifiers 535. The analyte modifier can be, for example, a protein stain, enzyme, dye, antibody, fluorophore, conjugate, or a reactive group that enhances analyte binding to the membrane. In some embodiments, the analyte modifier is a protein stain. In some embodiments, the analyte modifier is trypsin. Trypsin can be useful, for example, as a protease enzyme for cleaving or digesting protein analytes into smaller fragments for subsequent mass spectrometry. In some embodiments, the analyte modifier is sinapinic acid. Sinapinic acid can be useful, for example, for providing a matrix for subsequent mass spectrometry. In some embodiments, the analyte modifier is a binding agent that promotes the binding of eluted proteins to a surface onto which the proteins are dispensed.

The one or more analyte modifiers can be introduced through any one or more of the sheath flow channels. In some embodiments, the same one or more analyte modifiers are introduced through each of the one or more sheath flow channels. In some embodiments, each of the one or more sheath flow channels has a different composition of analyte modifiers.

Some blotting techniques involve total protein quantification, rather than the quantification of one or more specific "house-keeping" proteins. In these techniques, a process of staining or labeling is conducted after transferring the separated proteins to a membrane. By incorporating a protein stain in the sheath flow this separate labeling step of the process can be eliminated.

Furthermore, some blotting techniques involve the modification of analytes prior to their separation. This modification can be, for example, by protein staining or through the addition of charged molecules. These analyte modification process can potentially influence the subsequent separation of the analytes once modified. In contrast, by incorporating one or more analyte modifiers in the sheath flow, analytes are already separated prior to the use of stain, dye, reactive group that enhances analyte binding to the membrane, or any other modifier. This can alleviate a concern that separations will be impacted through the use of an analyte modifier.

The separation column and flow channels can be integrated on a single monolithic chip. The chip can comprise, for example, one or more of silicon, glass, polydimethylsiloxane (PDMS), polyethylene terephthalate glycol (PETG), polymethylmethacrylate (PMMA), cyclic olefin polymer (COP), cyclic olefin copolymer (COC), or quartz. The entrance end of one or more of the flow channels can be sealed with a chip-mounted seal 536.

Figure 6:
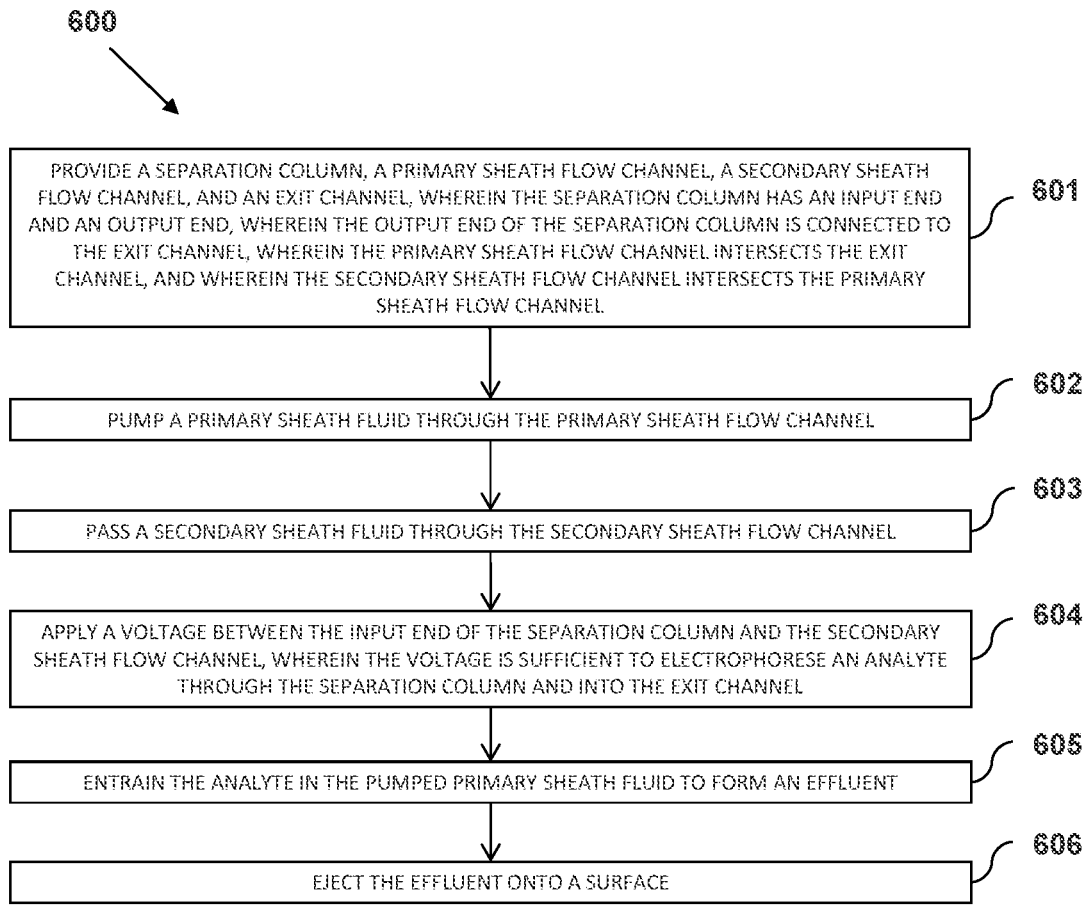
FIG. 6 is a flowchart of a process for separating and dispensing an analyte with a separation column, a primary and a secondary flow channel, and an exit channel, wherein the secondary sheath flow channel intersects the primary sheath flow channel.

FIG. 6 presents a flowchart of a process 600 for separating and dispensing an analyte. In operation 601, a separation column, a primary sheath flow channel, a secondary sheath flow channel, and an exit channel are provided. The separation column has an input end and an output end. The output end of the separation column is connected to the exit channel. The primary sheath flow channel intersects the exit channel. The secondary sheath flow channel intersects the primary sheath flow channel. In operation 602, a primary sheath fluid is pumped through the primary sheath flow channel. In operation 603, a fluid is passed through the secondary sheath flow channel. In operation 604, a voltage is applied between the input end of the separation column and the secondary sheath flow channel. The voltage is sufficient to electrophorese an analyte through the separation column and into the exit channel. In operation 605, the analyte is entrained in the pumped primary sheath fluid to form an effluent. In operation 606, the effluent is ejected onto a surface. The process of FIG. 6 can be carried out, for example, with the device of FIG. 3

Figure 7:
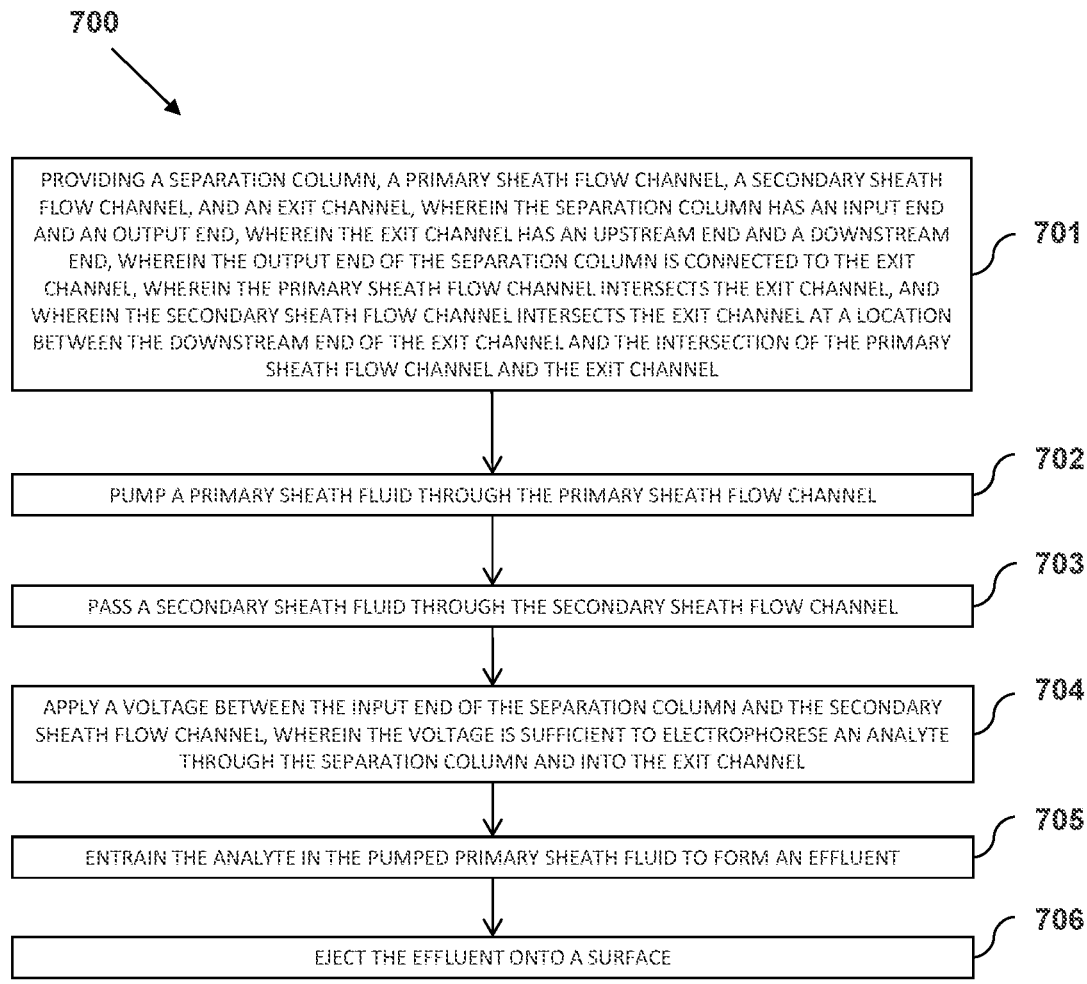
FIG. 7 is a flowchart of a process for separating and dispensing an analyte with a separation column, a primary and a secondary flow channel, and an exit channel, wherein the secondary sheath flow channel intersects the exit channel.

FIG. 7 presents a flowchart of a process 700 for separating and dispensing an analyte. In operation 701, a separation column, a primary sheath flow channel, a secondary sheath flow channel, and an exit channel are provided. The separation column has an input end and an output end. The exit channel has an upstream end and a downstream end. The output end of the separation column is connected to the upstream end of the exit channel. The primary sheath flow channel intersects the exit channel. The secondary sheath flow channel intersects the exit channel at a location between the downstream end of the exit channel and the intersection of the primary sheath flow channel and the exit channel. In operation 702, a primary sheath fluid is pumped through the primary sheath flow channel. In operation 703, a fluid is passed through the secondary sheath flow channel. In operation 704, a voltage is applied between the input end of the separation column and the secondary sheath flow channel. The voltage is sufficient to electrophorese an analyte through the separation column and into the exit channel. In operation 705, the analyte is entrained in the pumped primary sheath fluid to form an effluent. In operation 706, the effluent is ejected onto a surface. The process of FIG. 7 can be carried out, for example, with the device of FIG. 2.

In some embodiments, the primary sheath flow is composed of the same sieving gel used in the separation column The sieving gel can be at least 2-fold, at least 3-fold, at least 4-fold, at least 5-fold, at least 6-fold, at least 7-fold, at least 8-fold, at least 9-fold, at least 10-fold, at least 12-fold, at least 14-fold, at least 16-fold, at least 18-fold, at least 20-fold, at least 30-fold, at least 40-fold, at least 50-fold, at least 60-fold, at least 70-fold, at least 80-fold, at least 90-fold, or at least 100-fold more viscous that the secondary sheath flow fluid. In some embodiments, the sieving gel is at least 10-fold more viscous than the secondary sheath flow fluid. Therefore, the secondary sheath flow rate can be at least 10-fold higher than the primary sheath flow rate while maintaining the hydrodynamic (or hydraulic) resistance ratio necessary for immediate exit from the chip. The hydrodynamic resistance ratio between the exit channel and the separation channel determines the amount of backflow into the separation channel, proportionally. Assuming a fixed cross-sectional area, the hydrodynamic resistance is defined by the equation:

$$R\_hyd = \Delta p/Q \propto \mu L$$

where $\Delta p$ is the pressure drop, Q is the flow rate, $\mu$ is the dynamic viscosity, and L is the channel length.

The flow rates for the primary, secondary, and tertiary sheath flow fluids can be, for example, about 1 nL/min, about, about 2 nL/min, about 3 nL/min, about 4 nL/min, about 5 nL/min, about 6 nL/min, about 7 nL/min, about 8 nL/min, about 10 nL/min, about 20 nL/min, about 30 nL/min, about 40 nL/min, about 50 nL/min, about 60 nL/min, about 70 nL/min, about 80 nL/min, about 90 nL/min, about 100 nL/min, about 200 nL/min, about 300 nL/min, about 400 nL/min, about 500 nL/min, about 600 nL/min, about 700 nL/min, about 800 nL/min, about 900 nL/min, about 1 µL/min, about 2 µL/min, about 3 µL/min, about 4 µL/min, about 5 µL/min, about 6 µL/min, about 7 µL/min, about 8 µL/min, about 9 µL/min, about 10 µL/min, about 20 µL/min, about 30 µL/min, about 40 µL/min, about 50 µL/min, about 60 µL/min, about 70 µL/min, about 80 µL/min, about 90 µL/min, or about 100 µL/min. In some embodiments, the primary sheath flow rate is about 10 nL/min. The flow rates for the primary, secondary, and/or tertiary flow fluids can be within the range between 1 nL/min and 1 µL/min, between 3 nL/min and 3 µL/min, between 10 nL/min and 10 µL/min, between 30 nL/min and 30 µL/min, or between 100 nL/min and 100 µL/min. In some embodiments, the secondary sheath flow rate is about 90 nL/min. In some embodiments, the tertiary sheath flow rate is about 100 nL/min.

The provided methods can further comprise moving the position of the surface relative to that of the dispensing device. The moving can comprise changing the location of the surface as the dispensing device is stationary. The moving can comprise changing the location of the dispensing device and the surface is stationary. The moving can comprise changing the locations of both the surface and the dispensing device. The moving can comprise changing the location of the surface in one direction and changing the location of the dispensing device in an orthogonal direction.

The voltage at the first electrode is held at a different voltage than that at the second electrode. The difference in voltages causes analytes in the separation column to separate from one another in a technique known as electrophoresis. Electrophoresis is the induced motion of particles suspended in a fluid by an electric field, or as otherwise known in the art. Electrophoresis of positively charged particles (cations) is often called cataphoresis, while electrophoresis of negatively charged particles (anions) is often called anaphoresis.

The power for applying a voltage can supply an electric field having voltages of about 1 V/cm to 2000 V/cm. In some embodiments, the voltage is about 1 V/cm, 10 V/cm, 20 V/cm, 30 V/cm, 40 V/cm, 50 V/cm, 60 V/cm, 70 V/cm, 80 V/cm, 90 V/cm, 100 V/cm, 150 V/cm, 200 V/cm, 250 V/cm, 300 V/cm, 350 V/cm, 400 V/cm, 450 V/cm, 500 V/cm, 550 V/cm, 600 V/cm, 650 V/cm, 700 V/cm, 750 V/cm, 800 V/cm, 850 V/cm, 900 V/cm, 950 V/cm, 1000 V/cm, 1050 V/cm, 1100 V/cm, 1150 V/cm, 1200 V/cm, 1250 V/cm, 1300 V/cm, 1350 V/cm, 1400 V/cm, 1450 V/cm, 1500 V/cm, 1550 V/cm, 1600 V/cm, 1650 V/cm, 1700 V/cm, 1750 V/cm, 1800 V/cm, 1850 V/cm, 1900 V/cm, 1950 V/cm, or 2000 V/cm. The voltage can be, for example and without limitation, within the range between 1 V/cm and 100 V/cm, between 2 V/cm and 200 V/cm, between 5 V/cm and 400 V/cm, between 10 V/cm and 900 V/cm, or between 20 V/cm and 2000 V/cm. Higher voltages can also be used, depending on the particular separation method.

Motion of analytes or other material within the separation column can occur solely through electrophoresis. There can also be a bulk fluid flow through the separation column that contributes to the motion of analytes or other material. In some embodiments, the analytes or other materials within the separation column move only through the action of bulk fluid flow within the tube.

In certain aspects, the electrophoresis systems and methods of the present invention resolve or separate the analyte as a function of the pI of the analyte. The isoelectric point (pI) is the pH at which a particular molecule carries no net electrical charge. Other suitable techniques for resolution or separation include, but are not limited to, electrophoresis, isoelectric focusing, isotachophoresis, ion exchange chromatography, cation exchange chromatography, and hydrophobic interaction chromatography. Resolution can also be conducted using affinity chromatography, wherein separation results from interaction of one or more analytes with binding moieties such as antibodies, lectins, and aptamers, in the separation bed.

In some embodiments, one or more analytes are separated within the the separation column by isoelectric focusing prior to subsequent movement of the analytes within the column by a bulk fluid flow. In some embodiments, one or more analytes are moved within the separation column by a bulk fluid flow prior to their subsequent separation within the column by isoelectric focusing. In one provided embodiment of a method, an isoelectric focusing step is used to separate one or more analytes within the column, a bulk fluid flowing step is used to move the one or more analytes into the dispensing apparatus, and a dispensing step is used to dispense the one or more analytes onto a surface.

The movement of material within the exit channel is determined in part by the presence, directions, and magnitudes of sheath liquid flows, bulk fluid flow output from the separation column, and an electrical field within the separation column and the exit channel. In some embodiments, the contribution of bulk fluid flow is greater than that of an electrical field, and accordingly the movement of material within the exit channel is in a direction substantially towards the discharge outlet.

The liquid that exits the microfluidic discharge outlet can consist entirely of sheath liquid. The liquid that exits the microfluidic nozzle can consist entirely of material that is output from the capillary electrophoresis tube. In some embodiments, the liquid that exits the microfluidic nozzle comprises a mixture of sheath liquid and material that is output from the capillary electrophoresis tube, wherein the percentage of the mixture that comprises sheath liquid is about 0%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%. The percentage of sheath fluid in the effluent liquid can be, for example and without limitation, within the range between 0% and 60%, between 10% and 70%, between 20% and 80%, between 30% and 90%, or between 40% and 100%.

The dispensing can generate the formation of a continuous or discontinuous stream exiting the discharge outlet. The dispensing can generate the formation of droplets exiting the discharge outlet. The droplets can have volumes in the range from about 10 picoliter to about 10 nanoliter. The frequency of the droplets can be in a range from 0 to about 10,000 Hz.

The term "droplet" refers to a small volume of liquid, typically with a spherical shape, encapsulated by an immiscible fluid, such as a continuous phase or carrier liquid of an emulsion. In some embodiments, the volume of a droplet and/or the average volume of droplets is, for example, less than about one microliter (or between about one microliter and one nanoliter or between about one microliter and one picoliter), less than about one nanoliter (or between about one nanoliter and one picoliter), or less than about one picoliter (or between about one picoliter and one femtoliter), among others. In some embodiments, a droplet has a diameter (or an average diameter) of less than about 1000, 100, or 10 micrometers, or of about 1000 to 10 micrometers, among others. A droplet can be spherical or nonspherical. A droplet can be a simple droplet or a compound droplet, that is, a droplet in which at least one droplet encapsulates at least one other droplet.

The droplets can be monodisperse, that is, of at least generally uniform size, or can be polydisperse, that is, of various sizes. If monodisperse, the droplets can, for example, vary in volume by a standard deviation that is less than about plus or minus 100%, 50%, 20%, 10%, 5%, 2%, or 1% of the average droplet volume.

The method can utilize a computing apparatus that is programmed or otherwise configured to automate and/or regulate one or more steps of the method provided herein. Some embodiments provide machine executable code in a non-transitory storage medium that, when executed by a computing apparatus, implements any of the methods described herein. In some embodiments, the computing apparatus operates one or more of the pressure of the capillary electrophoresis solution reservoir, the pressure of the sheath liquid reservoir, the flow of liquid through the capillary electrophoresis tube, the flow of liquid through the sheath flow tube, the activity of the impulsive pump actuator, the moving of the surface, or the moving of the dispensing apparatus.

The term "automated" refers to a device, action, or method carried out by a machine or computer without direct human control. In some embodiments, the device and method described herein is operated in an automated fashion. In some embodiments, the automated method has subjective start and end points, thus the term does not imply that all steps of the operation are carried out automatically.

Also provided are devices that comprise a plurality of dispensing units. The dispensing units can be configured in a linear array. The dispensing units can be configured in a 2-dimensional array. In some embodiments, the device comprises 1, 2, 4, 8, 12, or more dispensing units. The dispensing units can each be connected to the same supply of sheath liquid. The dispensing units can each be connected to different supplies of sheath liquid.

Systems that incorporate the apparatus are also provided. Systems can include, for example, a power supply and power regulator to control the current and/or voltage to the first and second electrodes and the impulsive pump actuator. Additionally, pumps for regulating the flow of liquids, mechanisms for stirring or mixing liquids, and heating or cooling units can be included.

It is understood that all devices and methods described above can further comprise flow channels, pumps, and reservoirs in addition to the ones described. In some embodiments, each flow channel, pump, and reservoir on one side of the separation column is mirrored by a similar flow channel, pump and reservoir on the opposite side of the separation column. In this way, the device can have a substantially or approximately symmetrical configuration. In some embodiments, the device has an asymmetrical configuration.

Reference to a "first" component does not necessarily require that a second component be provided. Moreover reference to a "first", "second", or "third" component does not limit the referenced component to a particular location unless expressly stated. The terms "first", "second", and "third" when used herein with reference to elements or properties are simply to more clearly distinguish the two or more elements or properties and unless stated otherwise are not intended to indicate order.

The terms "about" and "approximately equal" are used herein to modify a numerical value and indicate a defined range around that value. If "X" is the value, "about X" or "approximately equal to X" generally indicates a value from 0.90X to 1.10X. Any reference to "about X" indicates at least the values X, 0.90X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.10X. Thus, "about X" is intended to disclose, e.g., "0.98X." When "about" is applied to the beginning of a numerical range, it applies to both ends of the range. Thus, "from about 6 to 8.5" is equivalent to "from about 6 to about 8.5." When "about" is applied to the first value of a set of values, it applies to all values in that set. Thus, "about 7, 9, or 11%" is equivalent to "about 7%, about 9%, or about 11%."

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications, websites, and databases cited herein are hereby incorporated by reference in their entireties for all purposes.

What is claimed is:

1. A method of separating and dispensing an analyte, the method comprising:
    providing a separation column, a primary sheath flow channel, a secondary sheath flow channel, and an exit channel, wherein the separation column has an input end and an output end, wherein the output end of the separation column is connected to the exit channel, wherein the primary sheath flow channel intersects the exit channel, and wherein the secondary sheath flow channel intersects the primary sheath flow channel;
    pumping a primary sheath fluid through the primary sheath flow channel;
    passing a secondary sheath fluid through the secondary sheath flow channel;
    applying a voltage between the input end of the separation column and the secondary sheath flow channel, wherein the voltage is sufficient to electrophorese an analyte through the separation column and into the exit channel;
    entraining the analyte in the pumped primary sheath fluid to form an effluent; and
    ejecting the effluent onto a surface.

2. The method of claim 1 further comprising:
    wicking the effluent into a membrane affixed to the surface to immobilize the analyte in the membrane.

3. The method of claim 2 further comprising:
    affixing the membrane to the surface and immobilizing the analyte in the membrane using a vacuum manifold connected to the surface.

4. The method of claim 1 wherein the secondary sheath fluid is the primary sheath fluid.

5. The method of claim 1 wherein the secondary sheath fluid is less viscous than the primary sheath fluid, and wherein the secondary sheath fluid has a higher flow rate than that of the primary sheath fluid.

6. The method of claim 1 further comprising:
    providing a tertiary sheath flow channel, wherein the tertiary sheath flow channel intersects the exit channel at a location between a discharge outlet of the exit channel and the intersection of the primary sheath flow channel and the exit channel;
    flowing an organic solvent through the tertiary sheath flow channel; and
    mixing the flowed organic solvent with the effluent.

7. The method of claim 6 wherein the mixing includes forming a spray mixture and wherein the method further comprises:
    imparting a voltage between the organic solvent and the surface, wherein the ejecting includes electrospraying of the spray mixture.

8. The method of claim 6 further comprising:
    independently adjusting flow rates of the primary sheath fluid, the secondary sheath fluid, and the organic solvent so as to control concentrations of the primary sheath fluid, secondary sheath fluid, and organic solvent in the effluent.

9. The method of claim 1 further comprising:
    independently introducing one or more analyte modifiers into one or both of the pumped primary fluid and passed secondary sheath fluid; and
    modifying the analyte with the one or more analyte modifiers in the exit channel.

10. The method of claim 9 wherein one or more of the analyte modifiers is a protein stain.

11. The method of claim 1 wherein the secondary sheath fluid is passed through the secondary sheath flow channel using a pressure source.

12. The method of claim 1 wherein the surface or exit channel is moved laterally with respect to the one another using a motor.

13. The method of claim 1 wherein the primary sheath fluid comprises a material selected from the group consisting of dextran, agarose gel, acrylamide, polyacrylamide, silica particles, and combinations thereof.

14. The method of claim 1 wherein the secondary sheath fluid comprises a material selected from the group consisting of water, sodium dodecyl sulfate, a buffer, agarose gel, acrylamide, polyacrylamide, silica particles, an organic solvent, and combinations thereof.

* * * * *